(12) United States Patent
Amat Roldan

(10) Patent No.: US 11,587,350 B2
(45) Date of Patent: Feb. 21, 2023

(54) METHOD AND DEVICE FOR THE CHARACTERIZATION OF LIVING SPECIMENS FROM A DISTANCE

(71) Applicant: TOUCHLESS ANIMAL METRICS, SL, Barcelona (ES)

(72) Inventor: Ivan Amat Roldan, Barcelona (ES)

(*) Notice: Subject to any disclaimer, the term of this patent is extended or adjusted under 35 U.S.C. 154(b) by 168 days.

(21) Appl. No.: 16/975,879

(22) PCT Filed: Feb. 14, 2019

(86) PCT No.: PCT/EP2019/053654
§ 371 (c)(1),
(2) Date: Aug. 26, 2020

(87) PCT Pub. No.: WO2019/162180
PCT Pub. Date: Aug. 29, 2019

(65) Prior Publication Data
US 2021/0004577 A1    Jan. 7, 2021

(30) Foreign Application Priority Data
Feb. 26, 2018    (EP) .................................... 18382110

(51) Int. Cl.
G06K 9/00    (2022.01)
G06V 40/10    (2022.01)
G06T 7/73    (2017.01)
G06T 7/50    (2017.01)
G06T 7/00    (2017.01)
G06V 10/44    (2022.01)

(52) U.S. Cl.
CPC .......... *G06V 40/103* (2022.01); *G06T 7/0014* (2013.01); *G06T 7/50* (2017.01); *G06T 7/74* (2017.01); *G06V 10/44* (2022.01); *G06T 2207/10024* (2013.01); *G06T 2207/10048* (2013.01); *G06T 2207/30188* (2013.01)

(58) Field of Classification Search
None
See application file for complete search history.

(56) References Cited

U.S. PATENT DOCUMENTS

2017/0196196 A1* 7/2017 Trottier ................ A01K 29/005
2020/0225076 A1* 7/2020 Fournier ................ G01G 17/08

* cited by examiner

*Primary Examiner* — Wei Wen Yang
(74) *Attorney, Agent, or Firm* — Eugenio J. Torres-Oyola; Victor M. Rodriguez-Reyes; Rafael Rodriguez-Muriel

(57) ABSTRACT

A method and a device for the characterization of living specimens from a distance are disclosed. The method comprises: acquiring an image of a living specimen and segmenting the image, providing a segmented image; measuring a distance to several parts of said image, providing several distance measurements, and selecting a subset of those contained in the segmented image. The method also processes the segmented image and the distance measurements referred to different positions contained within the segmented image by characterizing the shape and the depth of the living specimen and by comparing a shape analysis map and a depth profile analysis map. If a result of the comparison is comprised inside a given range, parameters of the living specimen are further determined including posture parameters, location or correction of anatomical reference points and/or body size parameters, and/or a body map of the living specimen is represented.

16 Claims, 24 Drawing Sheets

METHOD AND DEVICE FOR THE CHARACTERIZATION OF LIVING SPECIMENS FROM A DISTANCE

TECHNICAL FIELD

The present invention is directed, in general, to the field of automated measurements methods and systems. In particular, the invention relates to a method, and a device, for the characterization of living specimens such as livestock animals from a distance, i.e. remotely or in a touchless manner. The characterization includes the calculation of size parameters of the living specimens, including orientation, size and posture, among others, and/or a 3D representation of the living specimens.

In this document, by "map" it shall be understood a number of spatial relationships or a sequence of features or a graph (one, two or multi-dimensional) in which different information is related. Therefore, a map can be a sequence of body sizes and orientations or a relationship of body temperatures in different positions. This specially applies to shape analysis map, depth profile analysis map and body map.

BACKGROUND OF THE INVENTION

Methods and/or devices for remote characterization of living specimens are known in the field.

For example, EP3158289, of the same applicant of present invention, relates to a method and device for automated parameters calculation of an object such as a pig or other livestock animal. The method comprises: acquiring, by a two-dimensional camera, in a scene, a two dimensional image of at least one object; identifying the object within the acquired two dimensional image; calculating, by a first means, the size of a pixel of the object in the acquired and segmented two dimensional image taking into account the distance between the object and the two-dimensional camera; and calculating, by a second means, several parameters including at least the size, dimensions, body part dimensions, body features, weight and/or volume of the object by using said calculated size of the pixel and an a priori model of the object, wherein said a priori model includes information linking different parts, contours or shapes representative of several objects (200), previously acquired with a two-dimensional camera, with several parameters said several objects.

U.S. Pat. No. 5,474,085 provides a method and apparatus for remote sensing of livestock, using a thermographic image sensing system, in order to determine one or more of the number, weight, location, temperature, carcass pH, etc., of animals in a surveillance area. A thermographic image comprising pixels of the area is sent to a digitizing board in a microcomputer, where the image is converted into a number array. The numbers are then interpreted by software to provide the desired information in a decipherable form.

U.S. Pat. No. 5,412,420 discloses a system that measures the three-dimensional phenotypic characteristics of an animal, such as a dairy cow. The system uses a large number of modulated laser light beams from a Lidar camera to measure approximately 100 points per square inch of the animal Each laser beam measures intensity, horizontal, vertical, and depth dimensions, and by combining the measurements, the system composes a very accurate three-dimensional image of the animal. The system calculates the desired phenotypic measurements for conformation of the animal by combining measurements of selected points on the animal. The system then stores the measurements for each animal in a computer data base for later use. The system also stores a light intensity image of the animal's markings which is compared to other stored images.

US-A1-20150302241 discloses systems and methods for improving the health and wellbeing of subjects in an industrial setting. The systems may include a camera arranged so as to observe one or more features of a subject, and a processor, coupled to the camera, the processor configured to analyze one or more images obtained therefrom, to extract one or more features from the image(s) of the subject, and to analyze one or more of the features, or sub features nested therein to predict an outcome of a state of the subject. In particular the system may be configured to generate a diagnostic signal (e.g. an outcome, fever, mastitis, virus, bacterial infection, rut, etc.) based upon the analysis.

Document "Black cattle body shape and temperature measurement using thermography and KINECT sensor" introduces a black cattle body shape and temperature measurement system. As the authors of this document indicate, it is important to evaluate the quality of Japanese black cattle periodically during their growth process, not only the weight and size of cattle, but also the posture, shape, and temperature need to be tracked as primary evaluation criteria. In this study, a KINECT sensor and thermal camera obtains the body shape and its temperature. The whole system is calibrated to operate in a common coordinate system. Point cloud data are obtained from different angles and reconstructed in a computer. The thermal data are captured too. Both point cloud data and thermal information are combined by considering the orientation of the cow. The collected information is used to evaluate and estimate cattle conditions.

None of these prior art documents allows however performing fast (below the seconds regime) and automated measurements to obtain reliable, reproducible and accurate estimation of the 3D orientation and/or posture parameters of the living specimen and/or computing a body map thereof while the living specimen is freely moving in a farm or in its natural environment.

DESCRIPTION OF THE INVENTION

Present invention proposes, according to a first aspect, a method for the characterization of a living specimen from a distance, preferably a livestock animal such as a pig, a bull, a cow, a sheep, a broiler, a duck, or a chicken, etc. while the animal freely moves in a farm or in its natural environment. It should be noted that the method is applicable for the characterization of any object with complex shape.

The method comprises a) acquiring one image of a living specimen via an image acquisition unit such as a camera and further segmenting the acquired image by a processing unit, providing a segmented image; b) measuring, by a telemetric unit (at a given distance of the image acquisition unit), a distance to several parts of the acquired image, providing several distance measurements, and selecting a subset of those distance measurements contained in the segmented image of the living specimen; and c) processing, by a processing unit (equal or different to the other processing unit), the segmented image and said several distance measurements referred to different positions contained within the segmented image.

According to the proposed method said step c) comprises characterizing the shape of the living specimen, assessing the depth of the living specimen and comparing the results of said previous characterizations in order to obtain a quality parameter/estimation indicative that body parts of the living specimen or anatomical references are actually measured and properly positioned or a better estimation needs to be found.

That is, if the result of the comparison is comprised inside a given range, meaning that the measurements performed are correct, the method may further determine some parameters of the living specimen (e.g. posture parameters such as orientation in depth and/or bending of the body of the living specimen, location or correction of anatomical reference points, body size parameters, etc.) and/or may further represent a body map (preferably 3D) of the living specimen. On the contrary, if the result of the comparison is comprised outside said given range, meaning that the measurements performed are not correct, e.g. because the living specimen moved while the image was acquired, the method may further comprise repeating prior steps a) to c), and so obtaining a new depth profile analysis map and a new shape analysis map. Alternatively, if the result is comprised outside the range, it can be choose to do nothing and representing a body map of the living specimen that will have an associated error.

Preferably, the characterization of the shape is performed by implementing an algorithm that at least computes within the segmented image one or more of the following: a centroid of the living specimen, an orientation of the living specimen within the segmented image with regard to a reference point, and/or a specific body part of the living specimen by locating anatomical reference points of the living specimen within the segmented image. The result of the shape characterization provides a shape analysis map.

The characterization of the depth is also preferably performed by implementing an algorithm that at least computes within the distance measurements contained in the segmented image a specific body part of the living specimen by locating anatomical reference points of the living specimen within the distance measurements. The result of the depth characterization provides one depth profile analysis map (it can provide more than one).

It should be noted that the order the steps for the characterizations are made is irrelevant. Moreover, both characterizations can be made at the same time.

Moreover, according to the proposed method, the image acquisition unit (e.g. a camera either RGB, thermal or both cameras) and the telemetric unit (e.g. a Lidar system or a time-of-flight (TOF) system) are calibrated. Both units are preferably arranged at a given distance between them and in particular attached to a common support.

In an embodiment, the method further estimates part of a three dimensional information of the relative position of the image acquisition unit and the living specimen to obtain some additional parameters such as: the average of at least one angle between the image acquisition unit and the living specimen, the degree of bending or flatness of the shape of the living specimen, the height of the image acquisition unit with respect to the floor or the height of the image acquisition unit with respect to the height of the living specimen and/or an angle of the optical axis of the image acquisition unit with respect to the floor.

In an embodiment, the orientation of the living specimen is calculated by fitting the segmented image into an ellipse via a square fitting function, a Gaussian model, a principal component analysis (PCA), a minimal area rectangle, a Hough transform or a relative to main axis of bidimensional Fourier Transform, among others.

In case a body part is calculated in the shape analysis map, this body part can be computed by a circular Hough transform that computes the radius of a portion containing a ham or a thigh within the segmented image. Alternatively, the body part may be computed by a second order polynomial function that detects the tail of the living specimen within the segmented image by fitting a parabola around the centroid and an orientation axis.

Additionally, to improve the shape analysis map further calculations can be performed. For example, in an embodiment, the contour of the living specimen within the segmented image is computed, coding the computed contour in polar coordinates and further applying a Fourier Transform function to said polar coordinates, providing several Fourier coefficients, the modulus of which are rotational invariant and the argument of which contains rotational information.

In another embodiment, the segmented image can be coded as image moments, for example: statistical moments, central moments or Hu moments providing several coefficients that are a representation of the shape in a similar manner to Fourier transform. However, this operation can be applied to segmented area, contour or a subset of the contour.

In another embodiment, the contour of the living specimen is computed and distance metrics are further calculated within the computed contour based on a distance metric including Euclidean, geodesic, city block, among others.

In another embodiment, the contour of the living specimen from the segmented image is calculated by a skeletonization function, providing an image of the skeleton of the living specimen. Optionally, branchpoints and endpoints within said skeleton can be further calculated to estimate anatomical positions of different body parts.

In yet another embodiment, a distance transform of the segmented image is calculated.

Step a) may comprises the acquisition of several images of the living specimen at different periods of time, so that different postures of the living specimen can be captured. In this case, for each acquired image a sequence of distance measurements is obtained.

In this latter case, the information obtained for each acquisition can be integrated/combined, such that a sequence of paired depth profile analysis map and shape analysis map is obtained. Then, the method can further comprise assigning a score to each pair of maps and selecting the pair having a highest score. Alternatively, the method can further match anatomical reference points within all acquisitions and accumulate different pieces of the depth profiles analysis maps and anatomical reference points to compute a three dimensional reconstruction of the living specimen, or even, the method can compute a body map for each acquisition and accumulate all information of each body map, scoring into an extended (or improved) body map.

In case the body map of the living specimen is represented, this body map can be used to calculate characteristics of the body map based on features of the image acquisition unit (e.g. color, temperature, etc.) or to calculate additional characteristics measured by an additional device, previously calibrated (e.g. high resolution thermal camera, spectral properties).

It may happen that the acquired image includes more than one living specimen. In this case, the proposed method, in an embodiment, can compute and compare the shape analysis map and the depth profile analysis map obtained for each living specimen included in the image, such that all the specimens included in one image can be characterized in a single acquisition.

Present invention also proposes, according to another aspect, a device for the characterization of living specimens from a distance. The device comprises an image acquisition unit to acquire one or more images of one or more living specimens; a first processing unit to segment the acquired image, providing a segmented image; a telemetric unit to measure a distance to several parts of the acquired image, providing several distance measurements, and to measure a subset of those distance measurements contained in the segmented image of the living specimen; and a second processing unit configured to process the segmented image and said several distance measurements referred to different positions contained within the segmented image.

Preferably, the image acquisition unit and the telemetric unit are arranged at a given distance within a same support.

The first and second processing units can be independent units or the same unit.

According to the proposed device the second processing unit is adapted and configured to implement the method of the first aspect of the invention. Besides, the image acquisition unit and the telemetric unit are calibrated.

The image acquisition system can be a RGB camera with extended NIR in the red channel and/or a thermal camera. The telemetric unit can be a rotating Lidar, a scanning Lidar, a plurality of Lidars, a time-of-flight (TOF) sensor, a TOF camera, or any other telemetric means with or without moving parts based in single point or multiple point detection.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 3 shows the three different options that can be used, alone or in combination thereof, to obtain the shape analysis map.

DETAILED DESCRIPTION OF THE INVENTION AND OF PREFERRED EMBODIMENTS

Present invention provides a method and device for performing automated measurements of living specimens in order to characterize the living specimens.

Figure 1:
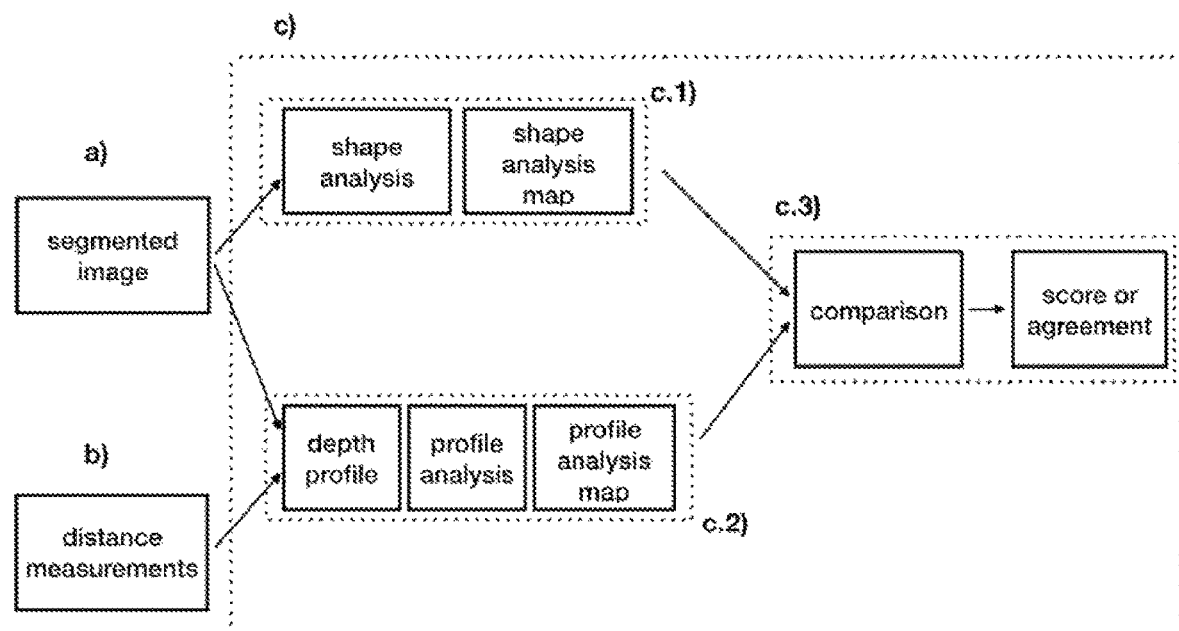
FIGS. 1 and 2 are two flow charts illustrating two embodiments of a method for characterization of living specimens from a distance.
Figure 2:
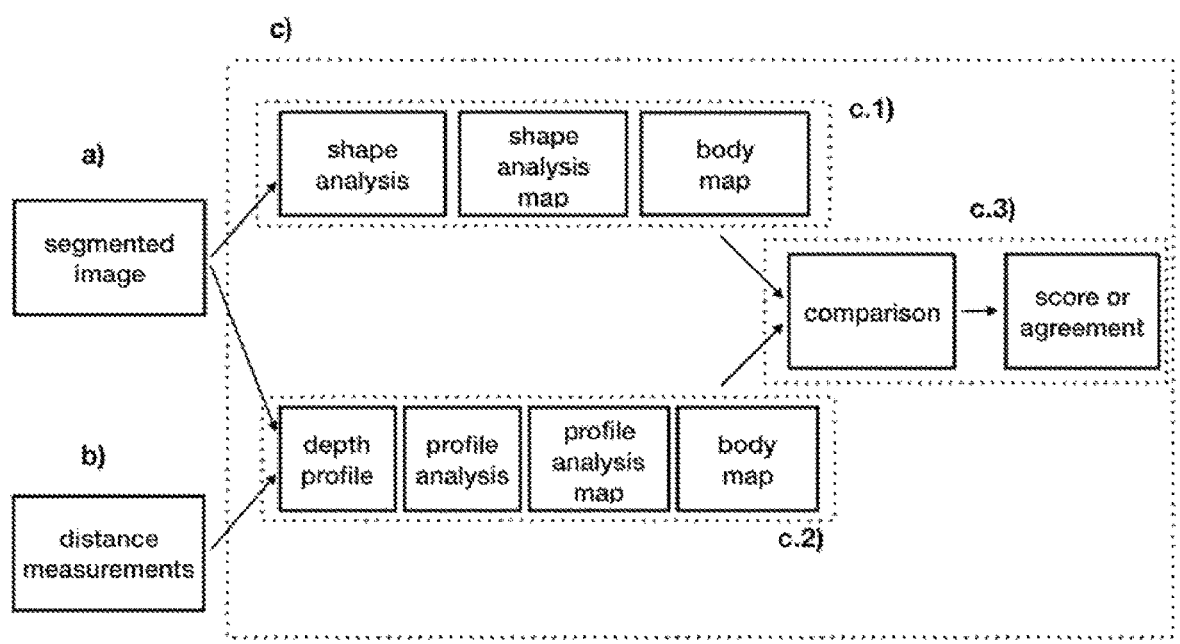

FIG. 1 graphically illustrates a flow diagram of the proposed method according to an embodiment. According to this embodiment the method acquires one image of a living specimen via an image acquisition unit such as a thermal camera or a RGB camera, in this particular case of a pig (not limitative as any living specimen can be characterized), and further segments the acquired image providing a segmented image (step a). At the same time, or later, the method measures via a telemetric unit a distance to several parts of said acquired image, providing several distance measurements, and selects a subset of those distance measurements contained in the segmented image of the pig (step b). The segmented image and the distance measurements are then processed (step c). In this particular embodiment, the processing step comprises characterizing the shape of the pig via an algorithm that computes a shape analysis map (step c1); characterizing the depth of the pig via an algorithm that computes a depth profile analysis map (step c2). Finally, the method involves a comparison of the shape analysis map and the depth profile analysis map (step c3). The result/score of the comparison can be used to decide if parameters of the pig can be computed with enough quality and/or a body map (see FIG. 2), preferably a 3D representation, can be computed with enough quality or if the method has to be repeated, corrected or stopped.

The acquired image is preferably a two-dimensional image of any type (for example, grayscale, color, thermal or color and thermal). Any segmentation method that converts the acquired image into a segmented image can be used. A segmented image is the result of processing one image (e.g. grayscale, color, thermal, or combinations thereof) and dividing the pixels of the image in two classes: (1) pixels that are contained in the pig and (2) pixels not contained in the pig.

Segmented images can be coded in different manners: (1) binary map, in which pixels contained within the pig are set to maximal value and pixels not contained within the pig are set to minimum value; (2) binary contour, in which pixels contained within the edge of the pig are set to maximal value and pixels not contained within the pig are set to minimum value; (3) vector, in which positions of the boundary are set in a vector.

The telemetric unit is configured to measure the distance of at least two points that are contained within the segmented image. Distance measurements can be obtained by different methods. For example, the telemetric unit can be implemented by a rotating Lidar with spin velocity of 10 Hz (100 ms for a full reading of angles and distances) and less than one degree of resolution. Previous calibration of the image acquisition unit and the Lidar, or calibration of thermal camera to a visible or near-infrared camera that is then calibrated to Lidar enables to build a table that is used to transform Lidar coordinates (i.e. angle and measured distance) to image coordinates (i.e. row and column of the two dimensional image). Alternatively, a dedicated camera with specific optical filter to detect only Lidar wavelength can be used for exact positioning of image coordinates and Lidar information. Alternatively, the telemetric unit can be implemented by new type of cameras with TOF technology which provide a two-dimensional image with distances. The velocity exceeds 10 frames per second, and in some cases it can achieve 1000 fps. Previous calibration of the image acquisition unit and TOF sensor or camera enables to find a relationship between pixels of the image acquisition unit and pixels of the TOF sensor or camera.

Calibration of the telemetric unit and image acquisition unit can be performed by a pair of heating resistors positioned on a plane at two arbitrary depths to that plane. In this case, the acquisition unit is a thermal camera that is positioned in a manner that the acquisition is parallel to the plane and heat resistors are positioned around the center of the vertical axis of the thermal image. Rotating Lidar is adjusted in a manner that the distances d1 and d2 of each heat resistor are measured with respect to an initial value of dL, for example 2 meters, with respect to Lidar coordinates (for the rotating Lidar this is angle and distance). As position in the acquired image changes with distances dL this operation is repeated for different distances dL. This procedure enables to build a table of points that relate pixel positions and measured distances. Then, a regression model is build that relates any Lidar coordinates (angle and distance) to specific (x,y) position in the acquired image and segmented image.

In another example, for the particular case of the image acquisition unit being a thermal camera and the telemetric unit being a TOF camera or sensor, the calibration is done as before but considering more points and not only relying with a scanning line of the rotating Lidar.

Other calibration methods are also possible. For example, an image acquisition unit composed by one RGB camera with NIR extension in the red channel and one thermal camera and a telemetric unit based on a rotating Lidar can be calibrated together.

Figure 3A:
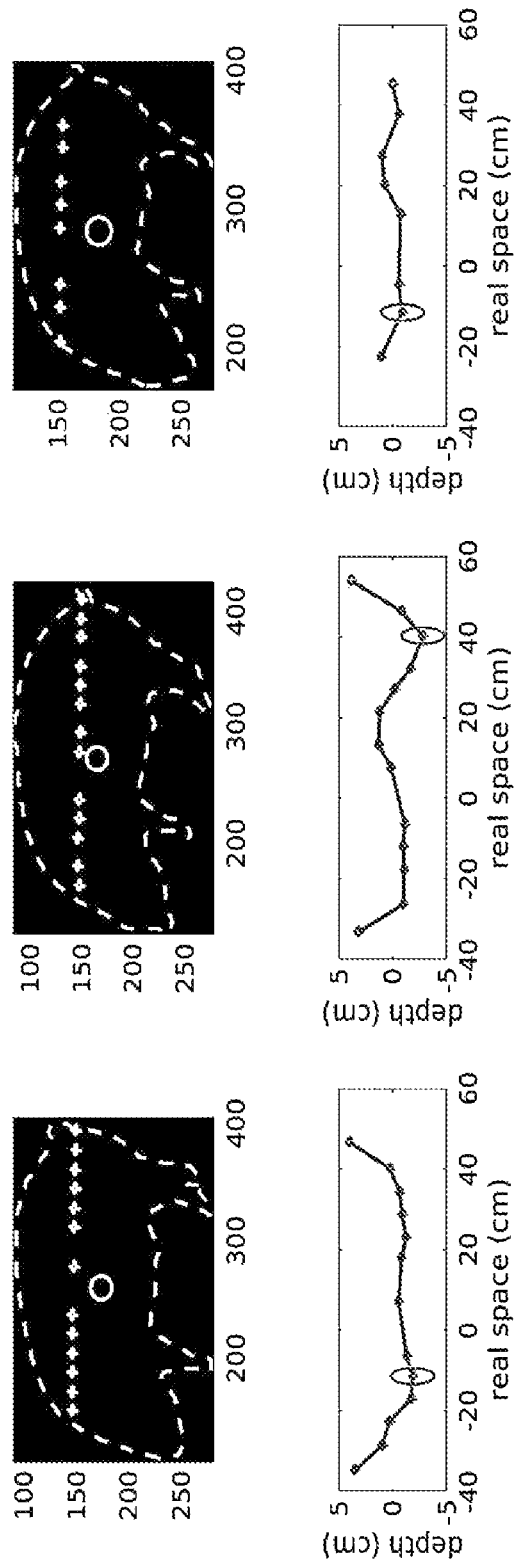
FIG. 3A shows three acquisitions in which tail is detected as the minimum distance of depth profile, and this is in agreement to shape analysis by having the closest centroid to the depth profile in the central column.
Figure 3B:
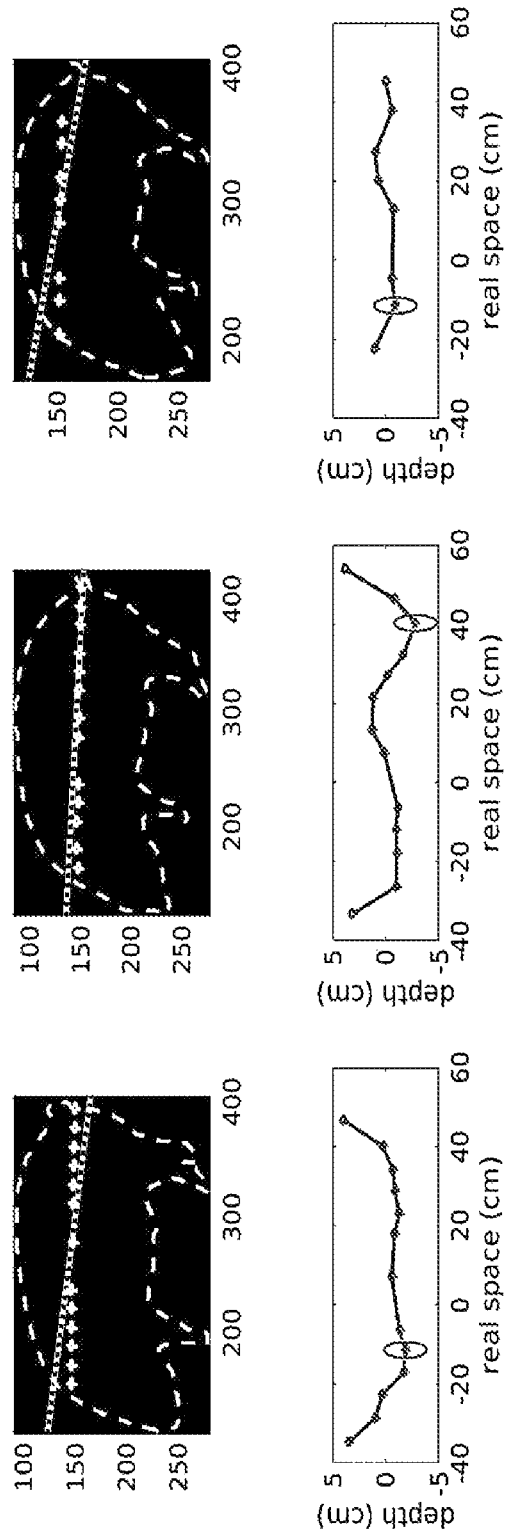
FIG. 3B shows the same three acquisitions in which tail is detected as the minimum distance of depth profile, and this is in agreement to shape analysis by having the most parallel axis to the depth profile in the central column.
Figure 3C:
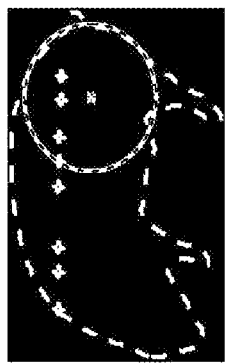
FIG. 3C shows the same three acquisitions in which tail is detected as the minimum distance of depth profile, and this is in agreement to shape analysis by locating the tail on the right side in the central column.
Figure 3C:
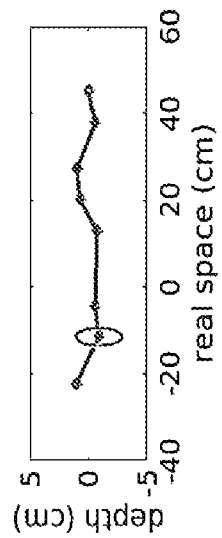
Figure 3C:
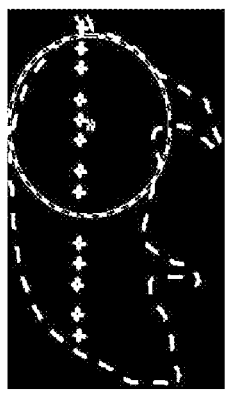
Figure 3C:
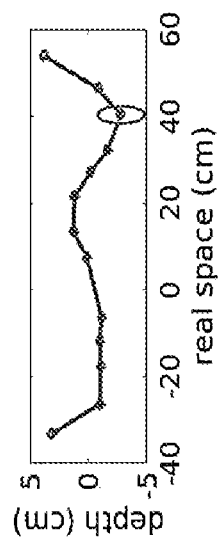
Figure 3C:
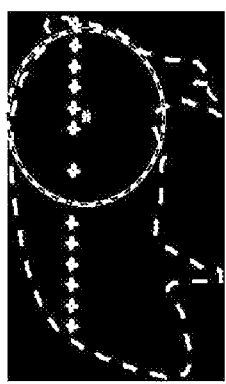
Figure 3C:
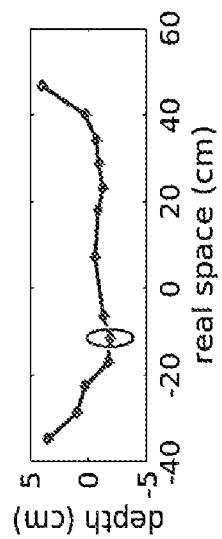

The shape characterization to compute the shape analysis map comprises the calculation of a centroid of the pig, of an orientation of the pig within the segmented image with regard to a reference point, and/or of a specific body part of the pig by means of locating anatomical reference points of the pig within the segmented image. It should be noted that only one methodology of the above indicated is needed in order to compute the shape analysis map. However, combinations thereof are possible. FIGS. 3A-3C show an embodiment of the three calculations.

To characterize the shape of the pig, the pig is defined by the segmented image. The shape of the pig is the shape of the segmented image. The acquired image and the segmented image can be expressed as a sequence of positions to build a binary map, a binary contour or a multipoint approximation of the contour. Thus, a segmented image, s(x, y), in any of its formats can be expressed as follows:

$$s(x, y) = \begin{cases} 1 & (x, y) \in \text{segmented image} \\ 0 & \text{elsewhere} \end{cases}$$

where x,y are columns and rows of the digital image, respectively.

To compute the centroid, in an embodiment, the shape of the pig is characterized by means of image moments: Following this format it is then possible to compute any image moment, $M_{nk}$ according to standard formulas:

$$M_{nk} = \sum_x \sum_y x^n \cdot y^k \cdot s(x, y)$$

The number of pixels is equal to moment $M_{00}$, centroid is equal to $(M_{10}/M_{00}, M_{01}/M_{00})$.

These moments can be directly extended to central moments, which are translational invariant. Then translational invariant moments can be further extended to scale invariant, and such scale invariant can be further extended to rotational invariants (Hu moment invariants) by well-known state of the art calculations. This set of moments enable to compute characteristic features that can be associated with specific shapes, like a pig shape seen from specific viewpoints (or orientation angles).

These moments can be also trivially extended to multiple dimensions, for example 3D to characterize also 3D shapes:

$$M_{nkl} = \sum_x \sum_y x^n \cdot y^k \cdot z^l \cdot s(x, y, z)$$

$$s(x, y, z) = \begin{cases} 1 & (x, y, z) \in \text{segmented volume} \\ 0 & \text{elsewhere} \end{cases}$$

where x,y,z are columns, rows and depth of digital volume, respectively.

To compute the orientation, the segmented image can be fitted into an ellipse by least squares fitting, Gaussian models, principal component analysis, Hough transform, etc. Orientation of the fitted ellipse, orientation of Gaussian distribution, angle of the first principal component or mean orientation of Hough lines are fast and reliable methods to estimate object orientation.

To compute the specific body part, according to an embodiment, see FIG. 3C, a Hough transform can be used. Hough transform can be implemented in many forms. In particular, circular Hough transform enables to identify circular areas for a range of radii. This can be used to differentiate the head and the tail of the pig. As the tail is rounder it can be fit to a larger circle. For example, taking into account the segmented image as a binary contour as shown in FIG. 3C circular Hough transform can be set to detect circles with high sensitivity and require just a number of points to fit a circle. Range of circles can by the following estimation: 1) radius of the ham, RH, shall be about ⅓ of the vertical size of the segmented image; 2) range of search for radii is then set to RH+/−50% of RH. Then the larger circle among the 5 circles with maximum votes is selected, which results in a circle centered in the tail part.

Hough analysis can be extended by semi-circular Hough transform and obtain fitting of half circles that will be more reliable to obtain tail and head differences. It is also extended to elliptical shapes to fit the central part or other parts of the body or head of the pig. Generalized Hough Transform is another method to fit a number of specific shapes at different scales and angles to match a shape. Similar shape matching methods are available and can be used in an equivalent manner.

Figure 4A:
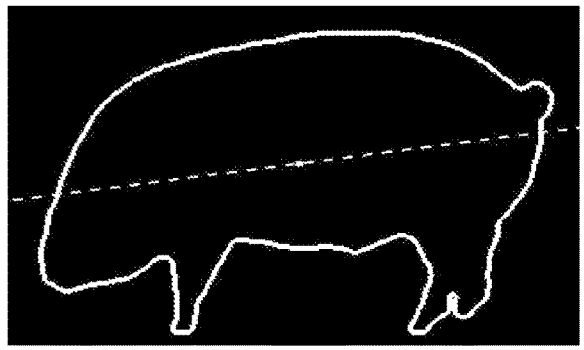
FIG. 4A illustrates how the computation of the centroid and estimated orientation is performed according to an embodiment.
Figure 4B:
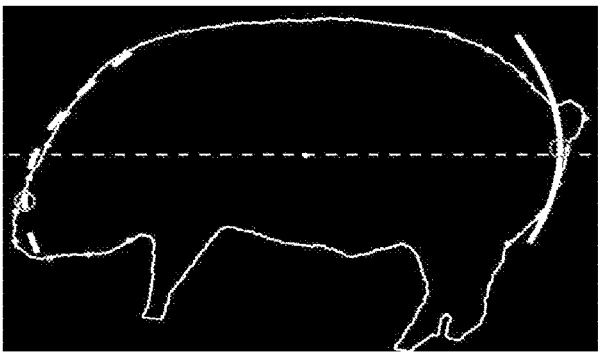
FIG. 4B shows how two parabolas are fitted to left (dashed line) and right (solid line) extremes of the contour after correcting the orientation.

In a similar manner, tail of the pig can be detected by fitting a second order polynomial to the axis defined by the centroid and the orientation angle. FIG. 4A shows the centroid and the orientation axis, FIG. 4B corrects the orientation and fits a parabola (second order polynomia) around both margins. The bottom is detected by the parabola that has the vertex closest to the centroid.

The shape analysis map can be perfected by further computing several strategies. For example, with Fourier analysis; in this case, contour of the pig can be coded in polar coordinates and then Fourier transformed. This provides several Fourier coefficients the modulus of which are rotational invariant and the argument of which contains rotational information.

Figure 5:
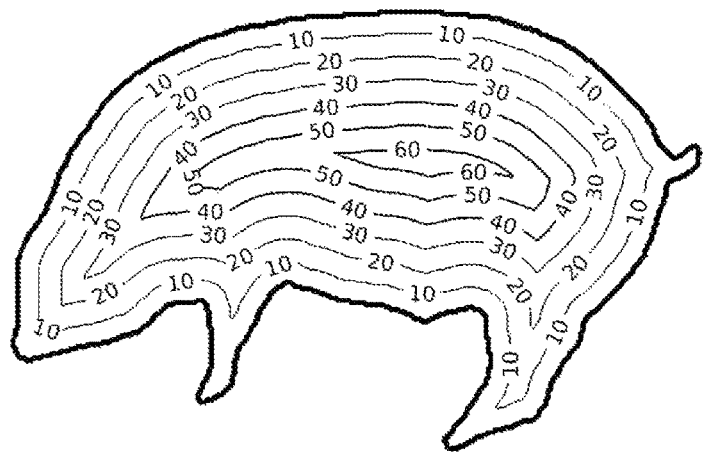
FIG. 5 shows a representation of distance transform of a binary image based on Euclidean metrics as contour lines. Tick dashed line shows the boundary of the segmented image. Image score is higher for those points that are further from any boundary.

FIG. 5 shows another strategy that can be used. In this case, segmented image is scored according to the distance of any point within the segmented image to the closest boundary point. The distance metrics can be manifold: Euclidean, city block, or any other distance metric.

Another strategy is to compute the contour of the pig by calculating a skeletonization function from the segmented image. Image skeleton is a thin version of that shape that is equidistant to its boundaries. The skeleton usually emphasizes geometrical and topological properties of the shape, such as its connectivity, topology, length, direction, and width. Together with the distance of its points to the shape boundary, the skeleton can also serve as a representation of the shape (they contain all the information necessary to reconstruct the shape). Branchpoints and endpoints can be then used to estimate anatomical positions of different body parts.

It should be noted that these complementary strategies to compute the shape analysis map can be used in combination between them.

Figure 6A:
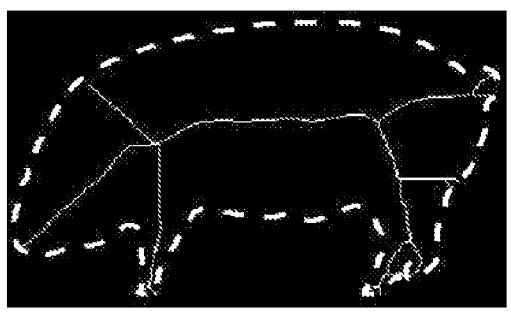
FIG. 6A image skeletonization.
Figure 6B:
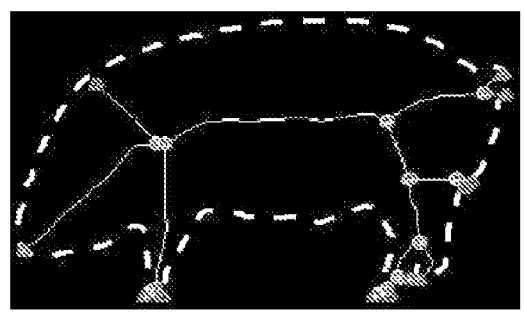
FIG. 6B triangles show endpoints and circles show branching points.
Figure 6C:
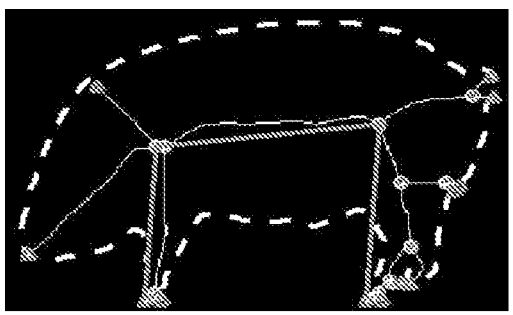
FIG. 6C straight line marks the connection between front foot, cross, hip and back foot which is a first estimation of anatomical reference points.

Referring back to FIGS. 3 and 4, these figures show examples on how shape analysis enables to identify the orientation of head to tail by proper "tail detection", which is a basic step to associate image points to body parts. Additional characterization of the shape enables to associate other image points to other body parts. For example, branchpoints with high boundary score (computed from distance transform) or nearby centroid axis can be associated to cross (shoulder) and hip as shown in FIG. 5. Tail detection further discriminates between cross and hip. Feet are determined by endpoints located at the bottom part of the segmented image and are almost perpendicular to the line drawn by cross and hip (or centroid axis) and the endpoints at the bottom part as shown in FIG. 6C.

Regarding the depth characterization of the pig to compute a depth profile analysis map this process comprises computing within the distance measurements contained in the segmented image a specific body part of the living specimen by locating anatomical reference points of the living specimen within the distance measurements.

This step can be divided in two main parts: (1) Localization of telemetric distances to image points is achieved by previous calibration as described above and enables to calculate image coordinates with depth information; and (2) relationship of image points and distances to body parts.

Figure 7:
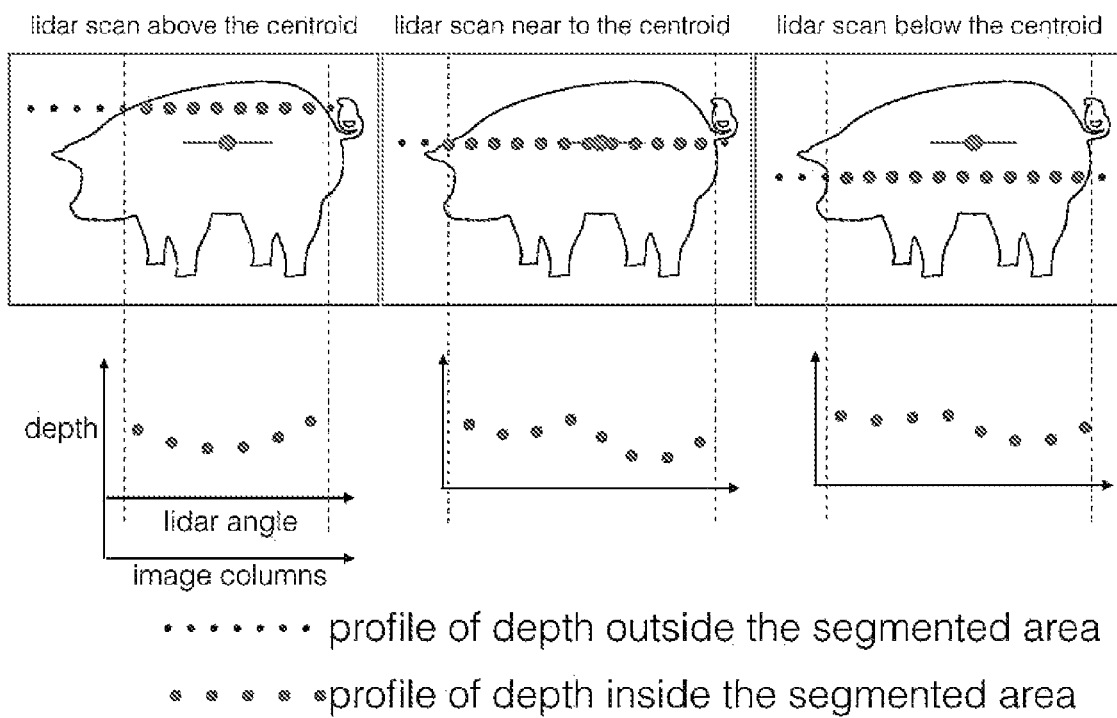
FIG. 7 illustrates how the matching of shape analysis map and location of Lidar scanning enables to know specific depth of a number of image points.

Image coordinates with depth information contained within the segmented image provide a profile of depth as shown in FIG. 7; the bigger dots are dots falling inside the segmented image, whereas smaller dots are outside. Outcomes of shape analysis map enable to associate image points (and depth information) to body parts or reference points. For example, depth information obtained from specific reference points, like centroid, cross, hip, tail, or other reference points obtained from anatomical references and other shape analysis like distance transform or skeletonization.

Specific alignment of the image acquisition unit and the telemetric unit enables to obtain relevant 3D information related to body sizes and higher reliability of the measured body parts or reference points. For example, alignment of rotating Lidar to centroid axis or the body line defined along cross and hip in the image enables to scan important body features to obtain specific depth information. FIG. 7, show that when aligning Lidar scans the centroid axis the profile of depth gets a multi-peak curve.

Figure 8:
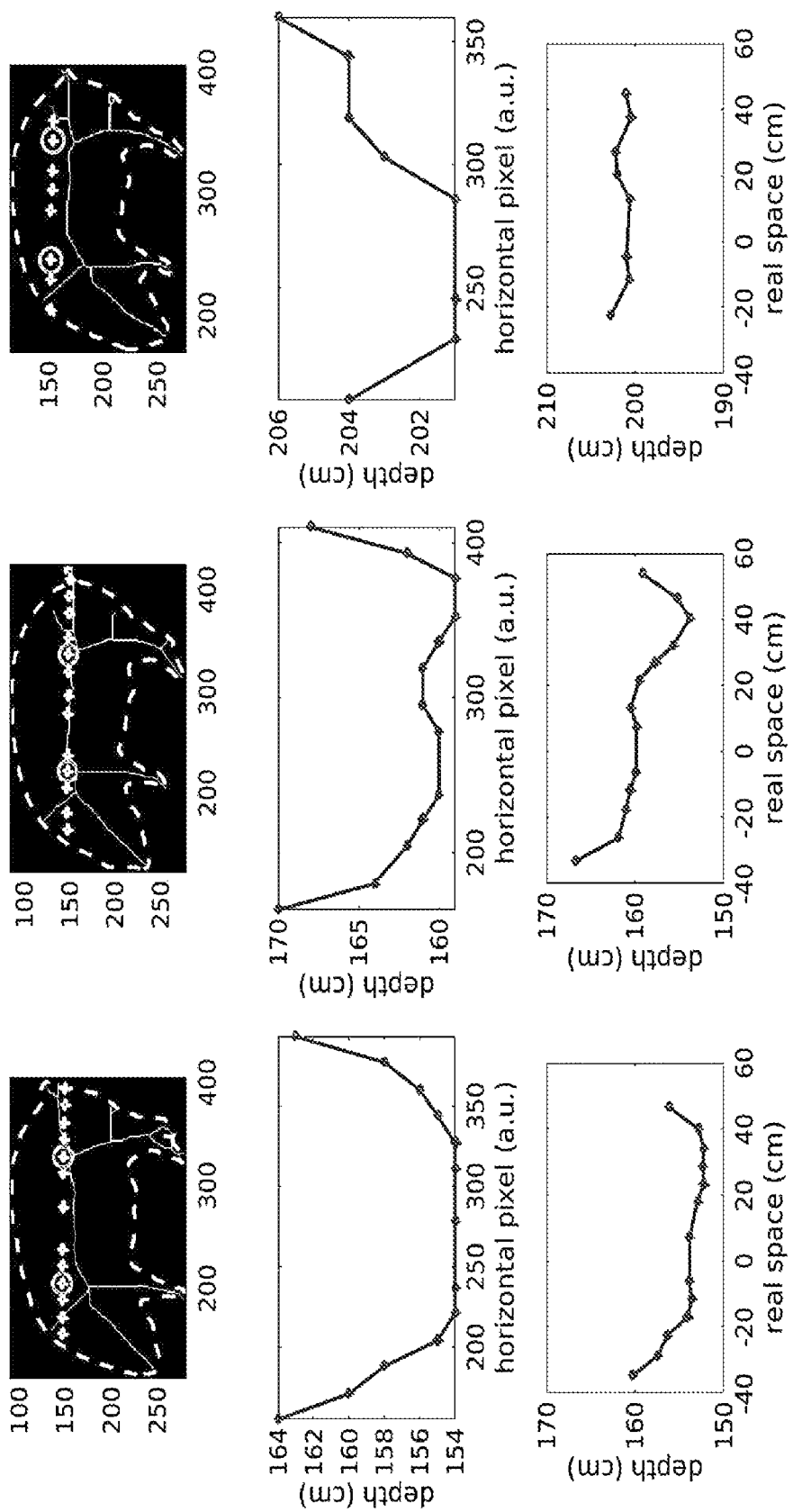
FIG. 8 Top row shows sequence of acquisitions of segmented image and telemetric measurements by a rotating Lidar, according to an embodiment. Central Row shows distance measurements and horizontal pixel position in the image. Bottom row shows transformation of distance and pixel positions to real space.

FIG. 8 shows practical examples on sequences of images acquired at different Lidar alignment with the axis defined by the cross and the hip points. At the top row it can be seen three binary contours (or silhouettes) in dashed lines; white crosses inside the contour show the image position of the distance measurements acquired by a rotating Lidar; circles show closest Lidar measurements to cross and hip positions defined by the skeleton, branchpoints and additional computations explained above. Central row shows measured distances and image position in horizontal pixels. Bottom row shows the converted measurements from image positions to real space.

Analysis of profile curves in real space enables to confirm whether reference points such as body parts or anatomical references are actually measured and properly positioned or a better estimation can be found.

Figure 9:
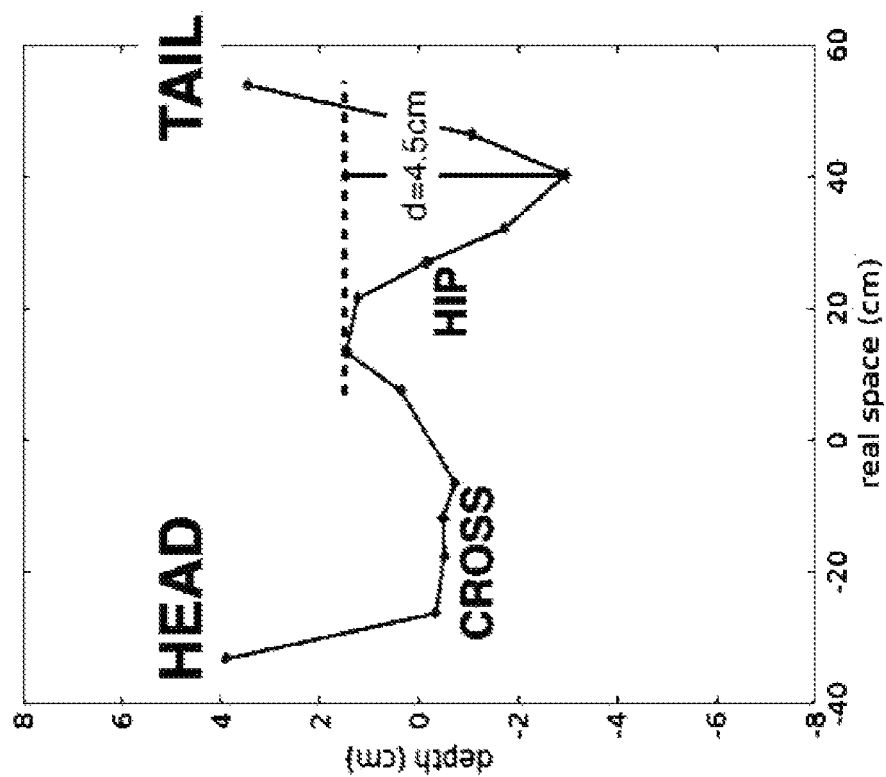
FIG. 9 show the angular correction of measured depth profile analysis map to measure specific body characteristics and estimate quality of the measurement.
Figure 9:
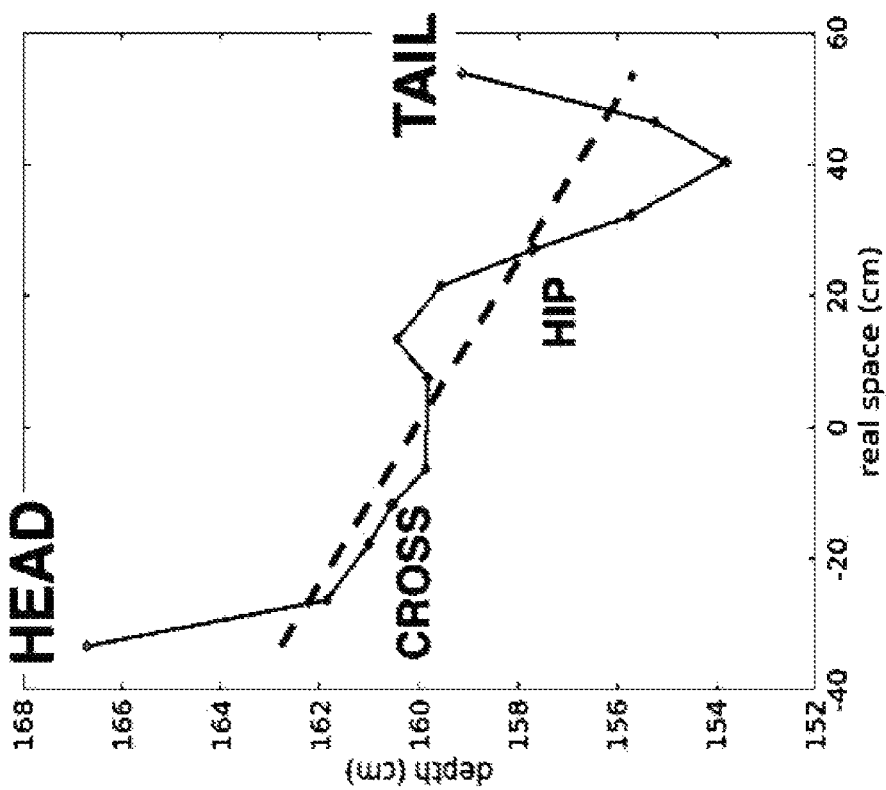

Left column of FIG. 8 shows a situation in which rotating Lidar scans the pig near the axis defined by the cross and the hip, as it actually passes very near from the point labelled as hip above and shown in FIG. 6. However, the angle of the rotating Lidar is off the axis defined by the cross and the hip. In this context, depth profile analysis map seems to lack important body features. Right column of FIG. 8 shows a situation in which rotating Lidar scans the pig away from the axis defined by the cross and the hip, in which it is not possible to obtain any depth information of the shape of the pig. Central column of FIG. 8 shows a situation in which rotating Lidar scans the pig following the axis defined by the cross and the hip. As it can be seen in the profile depth in real space the measurement contains information about the back leg. Back leg of a pig is an important part of the pig and the thickness of the back leg of a pig is a relevant feature in many contexts. For example, the size of the back leg of an Iberian pig is important when estimating the market value of the whole pig. FIG. 9 shows measured profile near the axis defined by cross and hip in real space which is corrected by estimating the linear component of the profile. This enables to measure thickness of the ham by estimating depth difference in the correct image from the furthest position between cross and hip to the closest position between hip and tail. This negative peak found at the closest position between the hip and the tail can be considered a new reference point named "hip-max", in reference that is the position in which thickness is maximal in the back leg. Location of this "hip-max" can be set as a constraint that must be fulfilled in a measurement in order to validate the whole orientation estimation, perform any body part measurement or store the depth information.

Figure 10A:
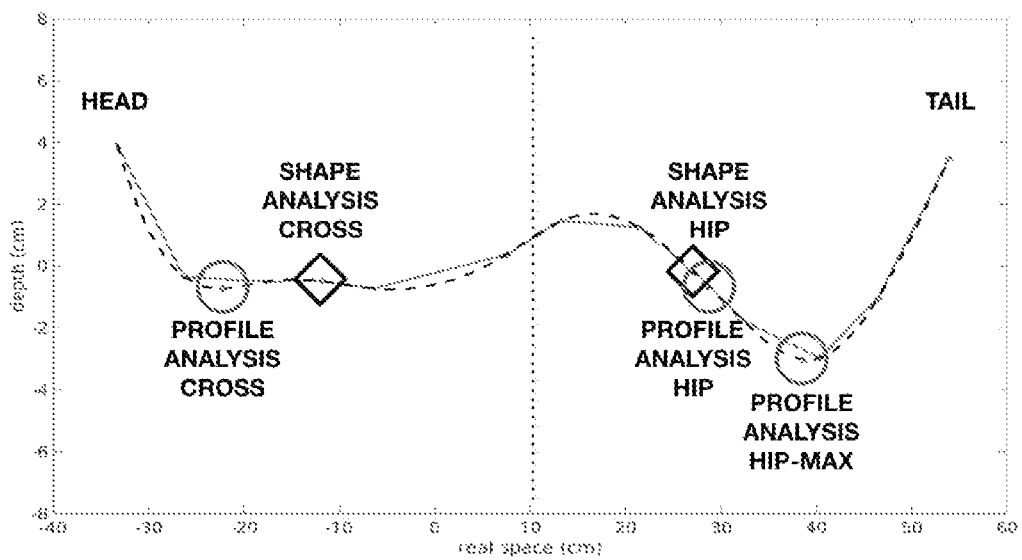
FIG. 10A Interpolation of corrected depth profile and annotation of body parts computed by shape and depth profile analysis, in which is possible to compare calculation of anatomical positions of both analysis.
Figure 10B:
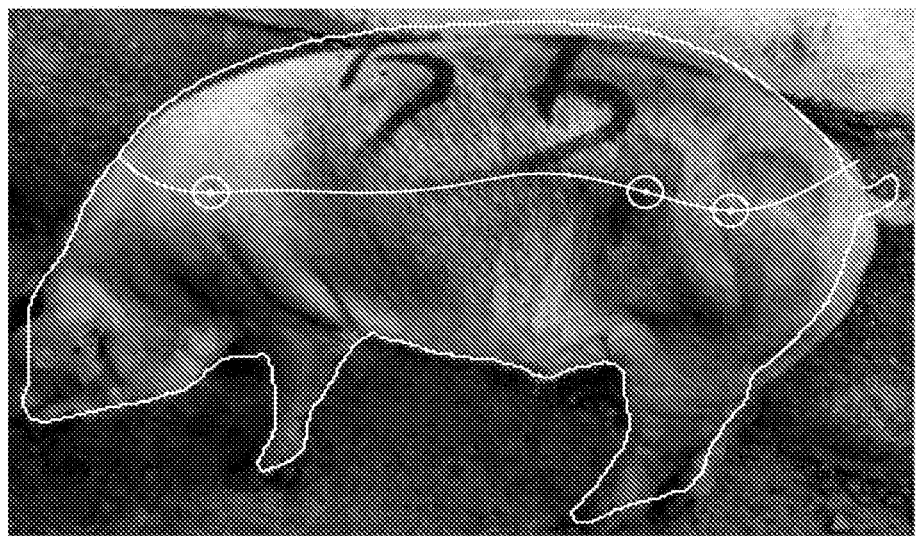
FIG. 10B original image with binary contour of the segmented image, interpolated depth profile analysis map and body parts as calculated by profile analysis in FIG. 10A.

Depth profile analysis map when scanned through key points (for example, passing through cross and hip points estimated on the segmented image by shape analysis) can be further used to estimate the exact position of reference points or body parts. An "a priori" model of the expected depth profile or spline interpolation can be used for this purpose. FIG. 10 shows spline-based interpolation of depth profile measurements of FIG. 9, tilted squared show cross and hip positions as calculated by shape analysis (as shown in FIG. 8), new body parts are recalculated from interpolated depth profile where: cross position is the minimal distance near head side on, hip-max is the minimal distance near tail side and hip is the inflection point between hip-max and the point of maximal near the centroid towards the tail side.

Figure 6D:
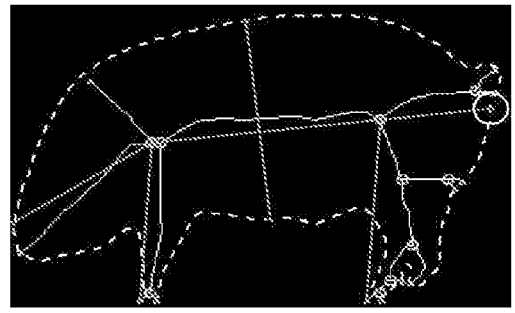
FIG. 6D additional lines mark the connection to other reference points like head and tail (with white circle) and central body width.
Figure 11:
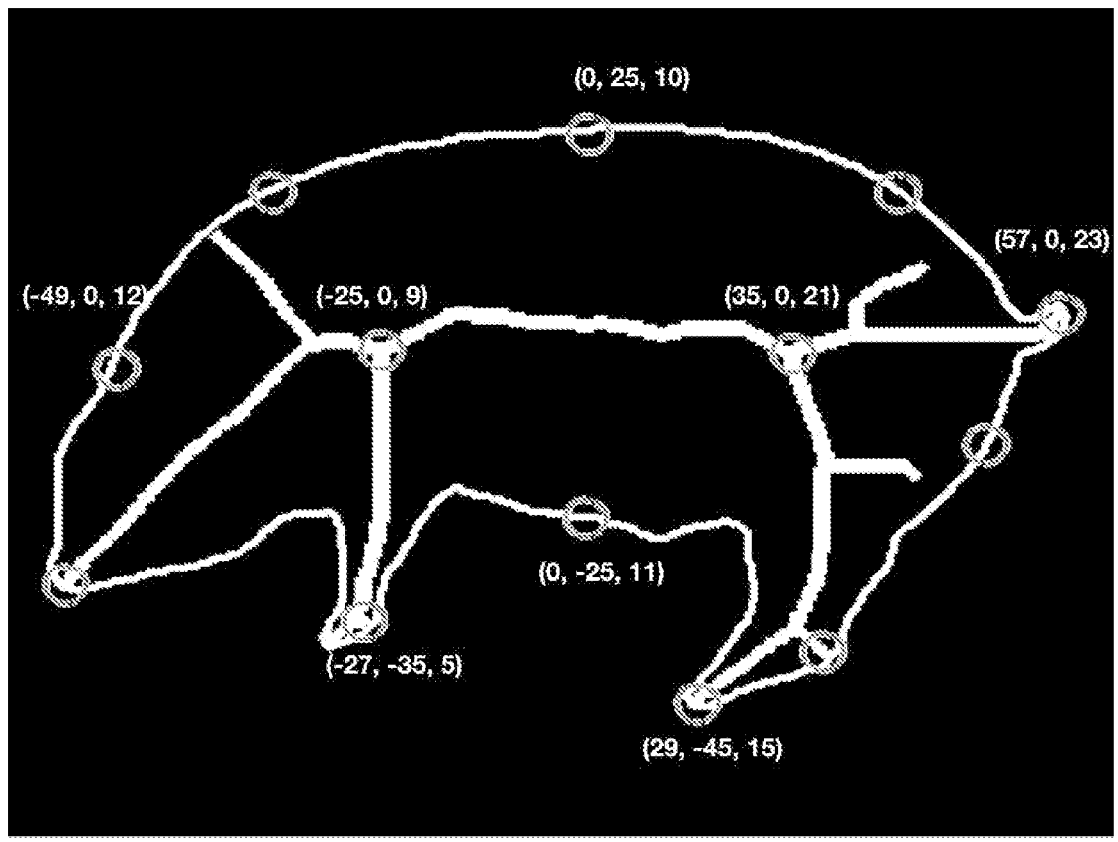
FIG. 11 is an example of a body map of a pig in which anatomical reference points are located within a three dimensional axis. Centroid is (0, 0, 0) and different parts of the body, like tail or head are mapped in real space showing coordinates in centimeters, for example.
Figure 12A:
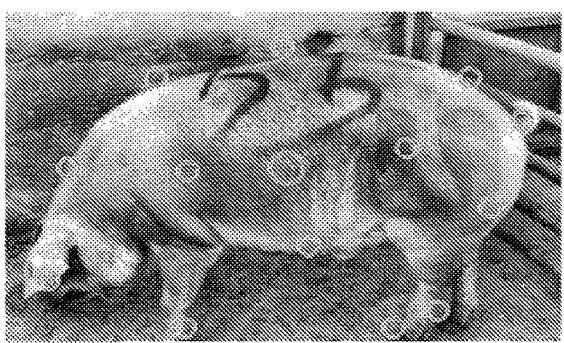
FIGS. 12A and 12B are two images of the same pig acquired in two different moments, a fence can be seen on the right side of (A), whereas a wall is the only background at (B)
Figure 12B:
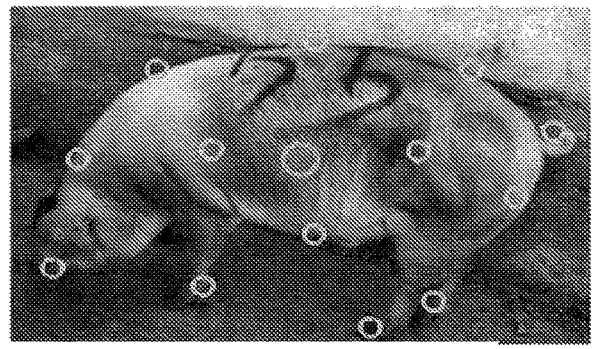
Figure 12C:
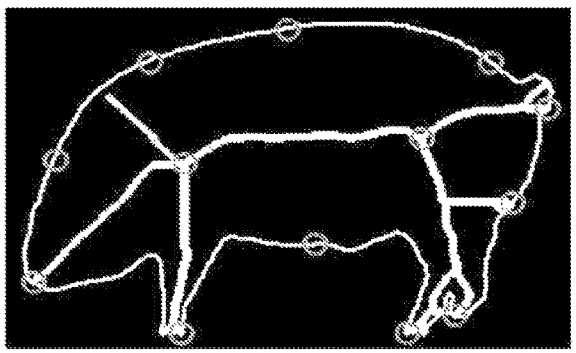
FIGS. 12C and 12D are skeletonization of segmented image, body parts are obtained by shape analysis and methods on FIG. 6.
Figure 12D:
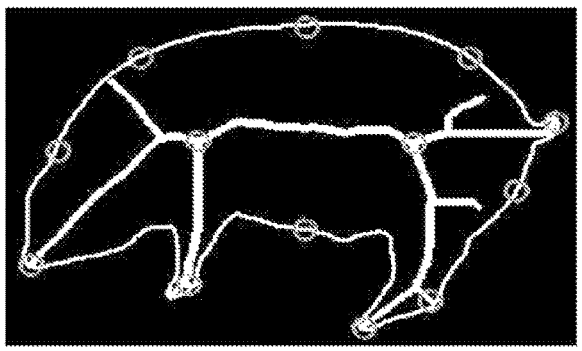

In a more general manner, relationship of image points and distances to body parts can be done by referencing depth measurements to reference points or body parts enabling to combine information of a sequence of measurements to have a more complete 3D picture of the animal or the complex object as shown in FIG. 11, i.e. the body map. This can be achieved as follows: (1) obtain reference points or body parts from shape analysis of segmented image as shown in FIG. 6D; (2) compute a normalized reference space; (3) compute a spatial transformation based on such reference points to the normalized reference space; (3) apply such spatial transformation to all acquisitions; (4) accumulate all depth profiles to the normalized reference space.

Figure 13A:
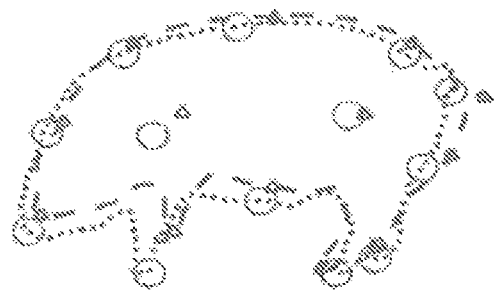
FIG. 13A shows overlapped binary contours and reference points and body parts of two acquisitions shown in FIG. 12.
Figure 13B:
FIG. 13B shows the normalized space by translation and rotation.
Figure 13C:
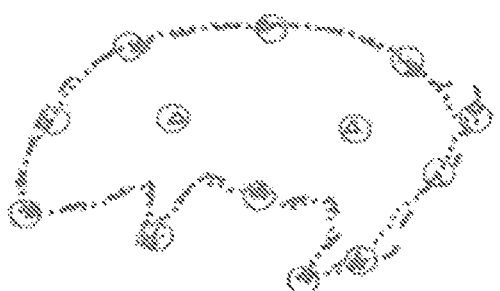
FIG. 13C shows the spatial transformation based on reference points.
Figure 14A:
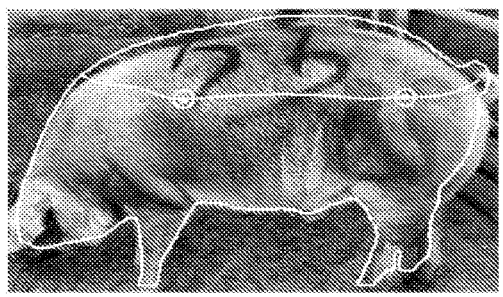
FIGS. 14A and 14B show contour, depth profile, reference points from profile analysis from FIG. 8 left and central columns, respectively.
Figure 14B:
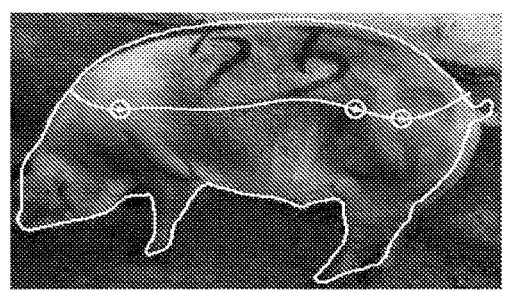
Figure 14C:
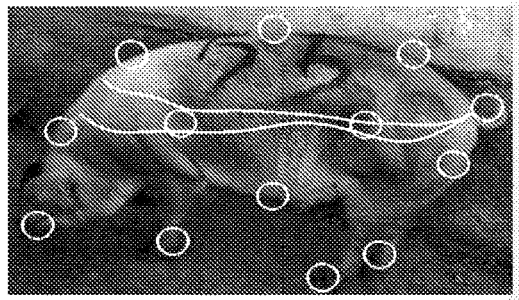
FIG. 14C show the overlap of reference points and depth profiles with corrected coordinates on image (B)
Figure 14D:
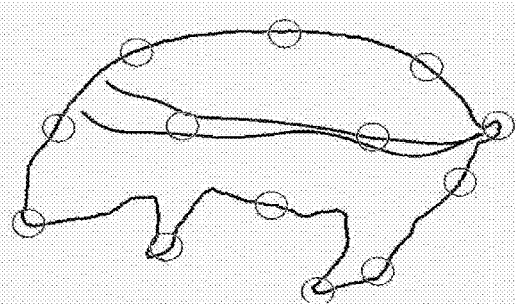
FIG. 14D show the overlap of reference points, contour and accumulation of two depth profiles analysis maps.

FIG. 12 shows the first step to obtain reference points or body parts from shape analysis of segmented image. FIG. 13A shows the overlapping of binary contour and reference points in coordinates of the segmented image. A first normalized space can be computed by direct translation of the binary contour to the centroid. Then, rotation of points by correcting orientation as computed above. The result is presented in FIG. 13B. As both acquisitions where obtained at similar distances scaling needs not to be corrected, but in some other acquisitions it might be required. A second refinement of coordinates can be achieved by building a spatial transformation based on reference point pairs as known in the art by different means: polynomial function, local weighted mapping or piecewise. Third order polynomial mapping is presented in FIG. 13C.

Depending on the agreement of the reference points between two acquisitions the accumulation of overlapping might be rejected and another acquisition might be requested. Acceptance of an acquisition can be limited to read a depth information profile that fulfils some expected rules when it is referred to specific reference points derived from the shape analysis as shown in FIG. 8, in which central column displays an acceptable acquisition in terms of scanning rotating Lidar through estimated cross and hip positions, and depth profile contains the expected peaks that are related to thickness of ham and shoulder. In this line, multiple scans of the rotating Lidar can be required in order to capture enough depth and shape information to compute animal or complex object orientation and sizes according to known information about animal, human or complex objects.

The above explanations also apply when a 3D camera and segmented image are used. For example, a thermal camera and a TOF camera can be used to estimate body orientation and sizes of an animal Thermal camera can be used to generate the segmented image that is processed according to the processes described above. TOF camera will provide depth information in multiple points, but shape analysis of the segmented image will provide the necessary body context to accept the acquisition. In a similar manner, TOF camera enables to perform multiple line scans from a single acquisition, and this might significantly speed up the overall acquisition time.

Figure 15:
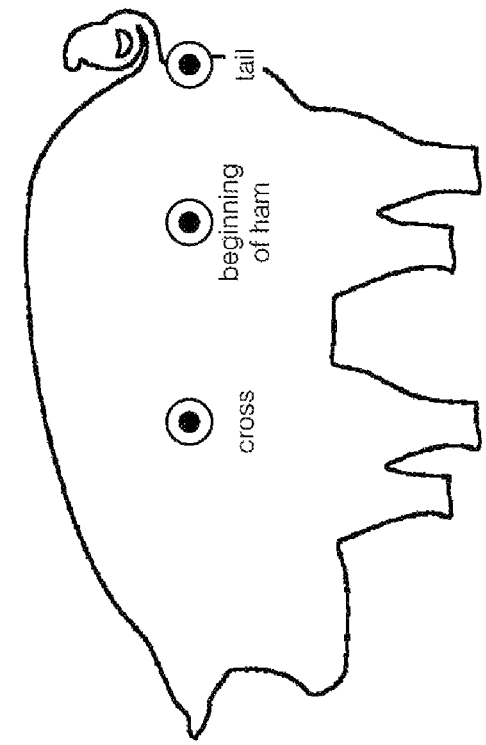
FIG. 15 shows the anatomical relationship of body parts or reference points.
Figure 15:
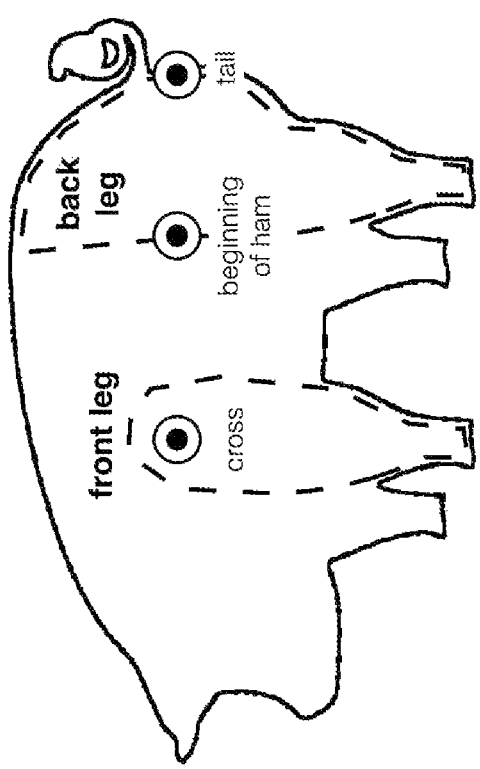

FIG. 15 shows the relationship of shape analysis map and/or image coordinates with depth information to obtain body parts or reference points, for example, cross, beginning of ham and tail as shown in the figure.

Figure 16:
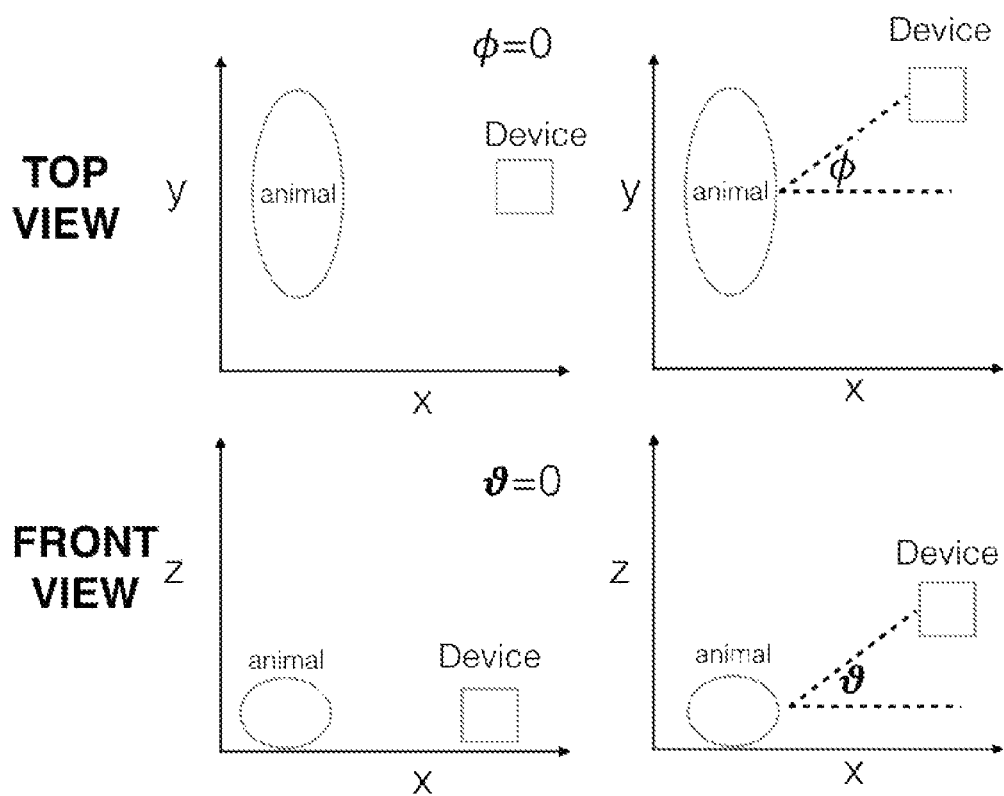
FIG. 16 illustrates top and front view projections for unambiguous relationship of phi and theta angles. In this figure it can also be observed that the images can be acquired from any angle and distance.
Figure 17A:
FIG. 17A is an image segmentation of a bull in which tips of the horns, central point between horns and mouth are detected and reference lines are traced in relationship to this pair points to build a shape map, dots show the image position in which depth profile of (FIG. 17D) is measured.
Figure 17B:
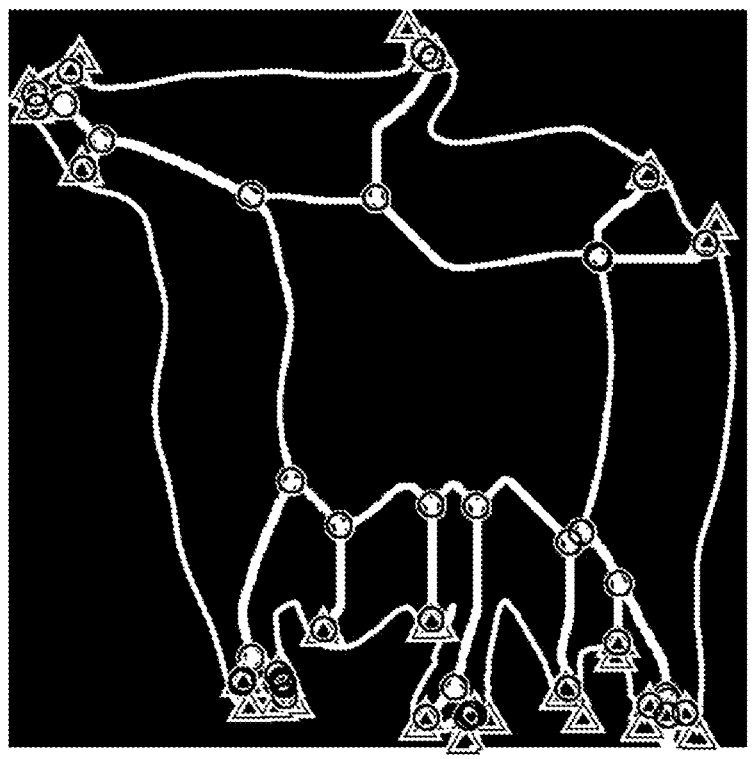
FIG. 17B shows shape analysis based on skeletonization and detection of branchpoints (circles) and endpoints (triangles)
Figure 17C:
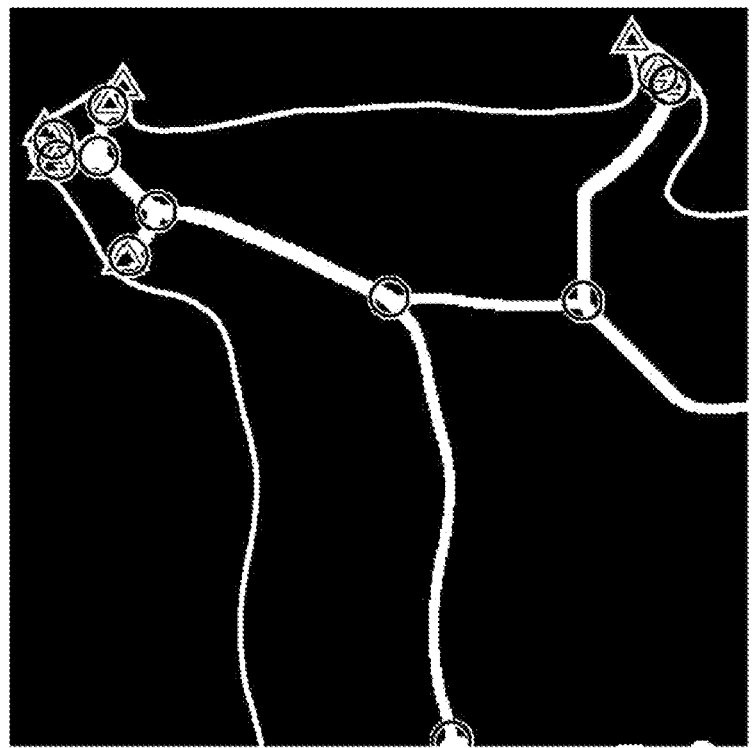
FIG. 17C is a zoom of FIG. 17B to show specific locations of branchpoints and endpoints.
Figure 17D:
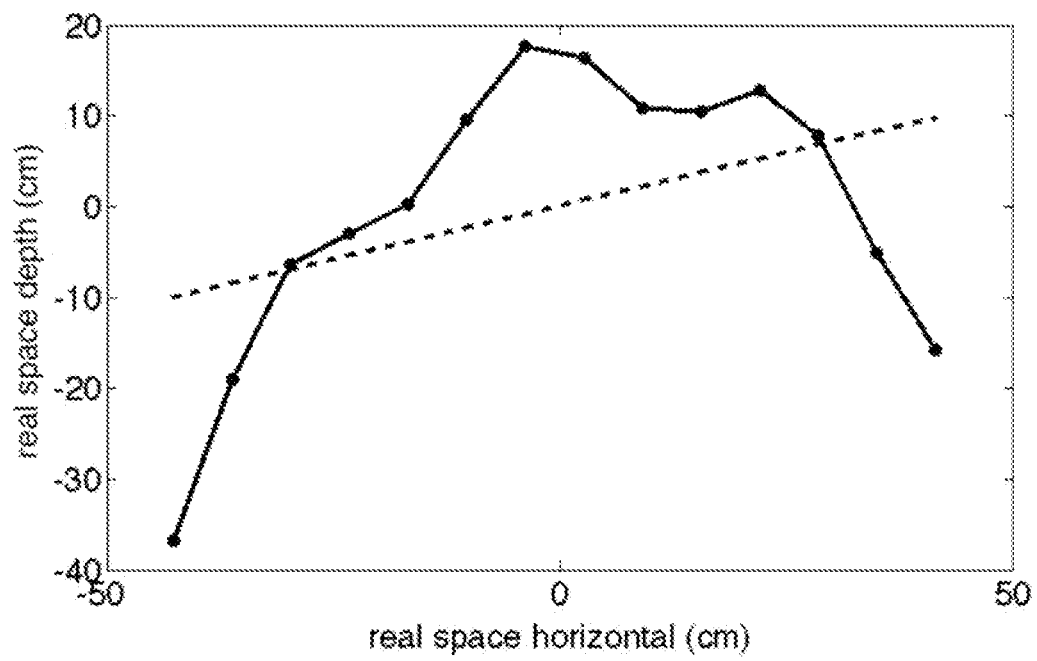
FIG. 17D is the depth profile at the base of the horns and the top of the head.

In an embodiment, the proposed method further comprises estimating part of the three dimensional information of the relative position of the image acquisition unit and the living specimen to obtain the average of at least one angle (theta or phi) between the image acquisition unit and the pig, see FIG. 16, for example by computing the arc tangent of the slope of the linear approximation of the depth profile analysis map. Besides, a degree of bending or flatness of the shape of the pig can be also obtained. Flatness or bending can be estimated by extending the approach shown in FIG. 9, in which it is possible to fit a linear function to estimate phi angle. However, this principle can be extended to any shape, for example, by a polynomial of second or third order. Adjusted R squared coefficient can be used to evaluate whether a quadratic function fits better than a linear model. When quadratic function it is more likely to fit, it means the animal is bended and measurements need to be repeated or properly corrected. Iberian pig is a highly muscular animal compared to other types of pigs and it generally bends its body and adopts a protective shape. This must be taken into account frequently in order to overcome this source of error in the characterization.

The height of the image acquisition unit with respect to the floor or the height of the image acquisition unit with respect to the height of the pig can be also obtained. In the first case, an additional telemetric unit might also provide additional distance measurement means to estimate the relative height at which the image acquisition unit and telemetric unit operate. In the second case, as at least one distance is measured by the telemetric unit and segmented image is directly associated to distance measurement it is possible to estimate animal height. Total animal height can be computed as follows: (1) the vertical extent of segmented contour after orientation has been corrected as described above; (2) computation of number of pixels is converted by the relationship of distance and vertical field of view or calibration. If rotating Lidar is configured to scan vertically or the telemetric unit provides a 2D image of distances, using reference points or body parts it will be possible to extract the 3D coordinates and compute the height as a distance between coordinate points. In a similar manner it is possible to estimate the height from a reference point or body part, for example "hip-max" as described above to back foot, also described above. Then, number of pixels can be converted according to relationship of field of view and distance, another calibration method, from vertical rotating Lidar, or 2D image of distances as coordinate distances.

Even, the angle of the optical axis of the image acquisition unit with respect to the floor can be obtained.

In an embodiment, the proposed method also enables the calculation of relationships among different body parts or reference points to obtain body analysis of the pig. All reference points or body parts can be used to build a simplification of the pig as shown in FIG. 6. Calibration enables to compute any image point to 3D coordinates in real space, which enables direct estimation of orientation and sizes on complex objects, animals and humans. Head to tail as total animal length, cross to tail as body length, cross to hip as short body length, hip to back feet as ham length, cross to front feet as front leg length, mid body top and bottom as animal width. FIG. 9 also shows how to estimate ham thickness from depth profile analysis map, which is an important feature of Iberian hams. Also corrections made on positioning of cross, hip or hip-max might provide more reliable or more interesting size and orientation measurements. Also area and volume measurements can be done. Area measurement of ham can be achieved by keeping only the area of the segmented image beyond the hip point. By adding depth profile analysis map information a volume estimation of ham can be also produced. Similarly, body area and volume can be achieved by keeping area beyond cross as reference point.

All context data, such as phi angle of acquisition, minimal, maximum and average distance, different sizes, and relationship between different sizes, such as lengths, area or volumes can be used to generate a sequence of features of the pig.

In this document, the shape of a pig works as a general example of a complex shape. Other animals like cattle, chicken, broilers, bulls, cows, sheep, would particularly fit this approach as they are livestock animals. Humans can be also modelled under these references and complex objects might need specific adaptations as a complex object is a broad term. However, objects following a pattern with clear reference points which are not simply squared, triangles or round can be directly adapted from this approach that combines shape analysis of segmented image and depth information obtained by telemetric means (Lidar, rotating Lidar, scanning Lidar, TOF cameras, or any device providing a 1D or 2D sequence of distances) that has been properly calibrated.

Figure 18:
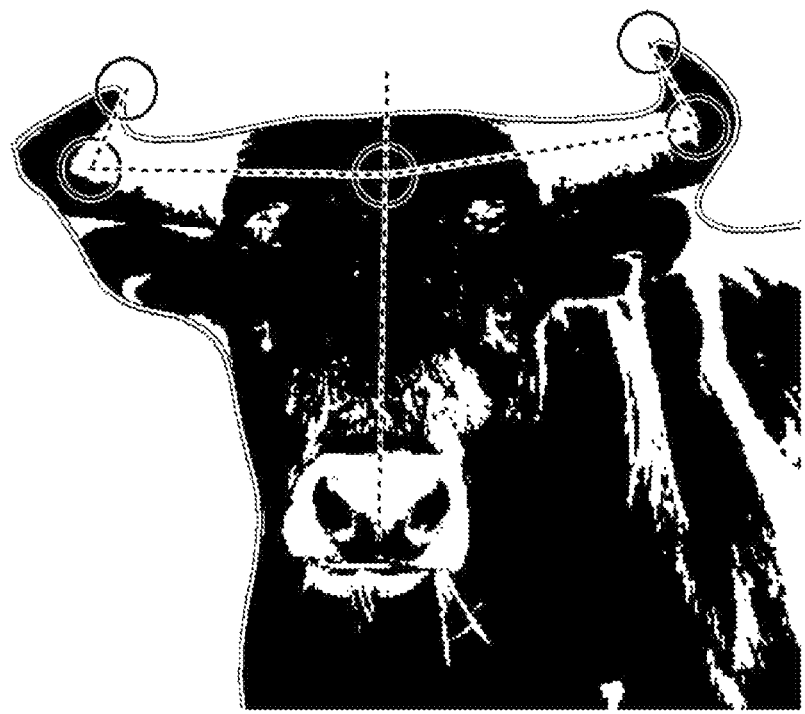
FIG. 18 illustrates the shape analysis map of the head to locate horns and calculate total length.
Figure 19A:
FIG. 19A Original image.
Figure 19B:
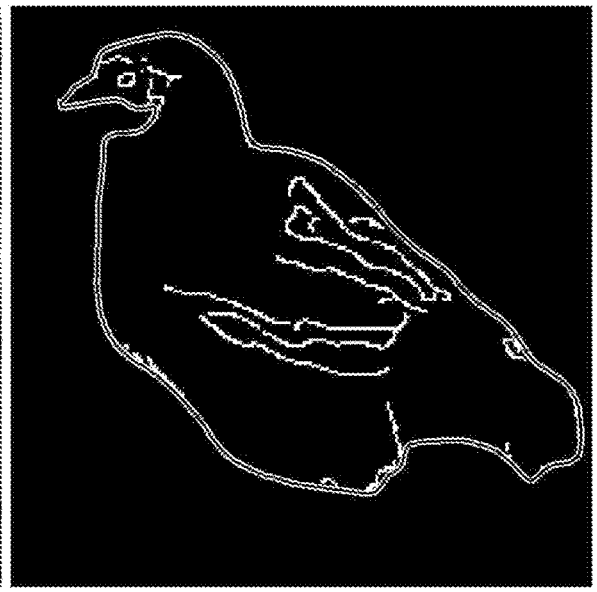
FIG. 19B delineated and inner contours from canny edge.
Figure 19C:
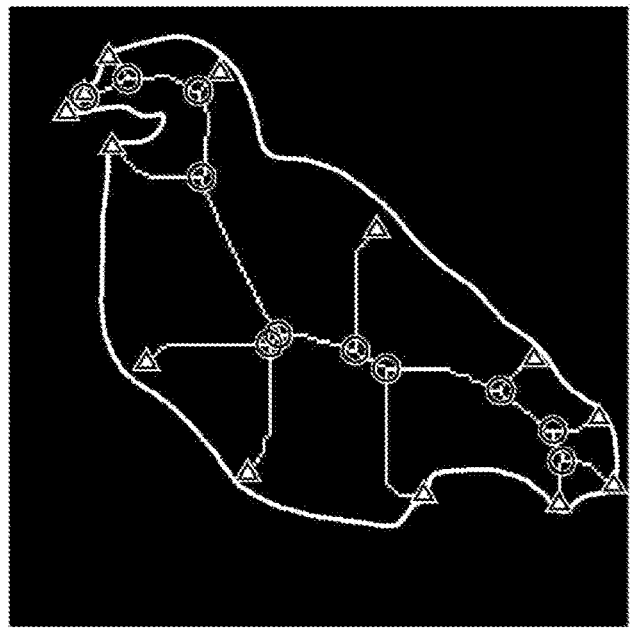
FIG. 19C skeletonization, branchpoints and endpoints as basis of shape analysis map.
Figure 20A:
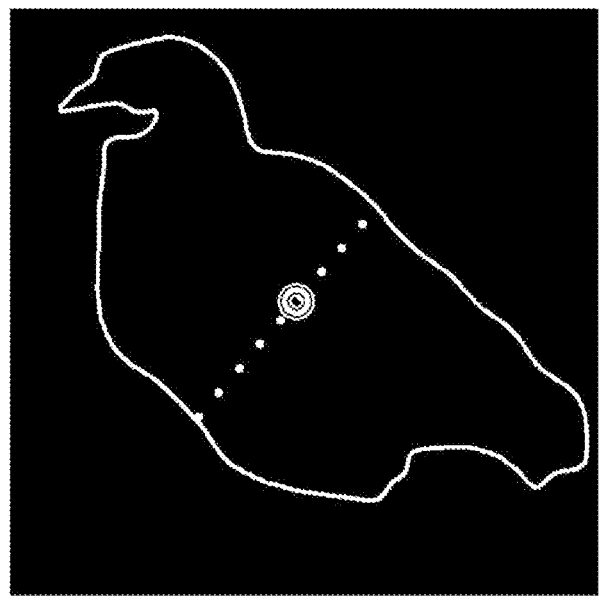
FIG. 20A is a segmented image as contour, centroid as white circle and image positions of depth profile analysis map as axis perpendicular to the orientation shown as dotted line.
Figure 20B:
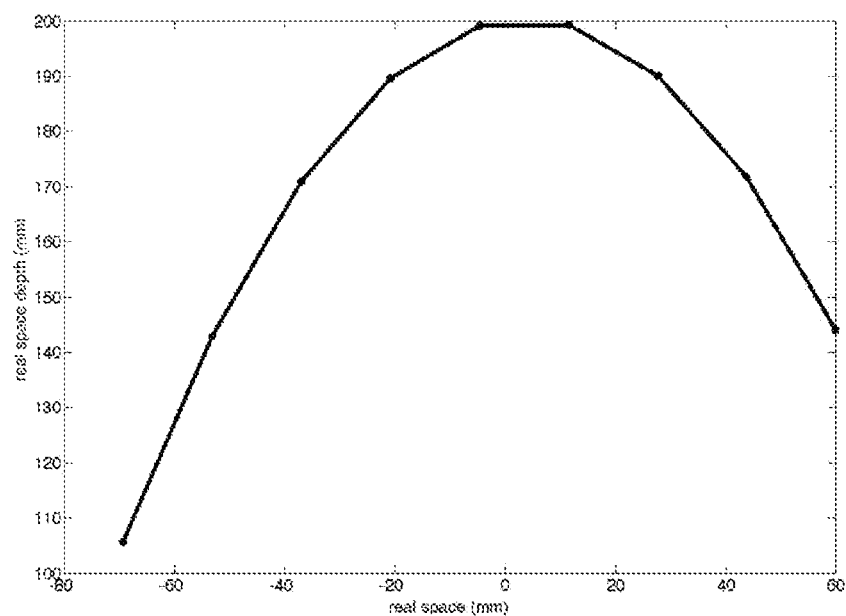
FIG. 20B is the obtained depth profile analysis map in real space.
Figure 21A:
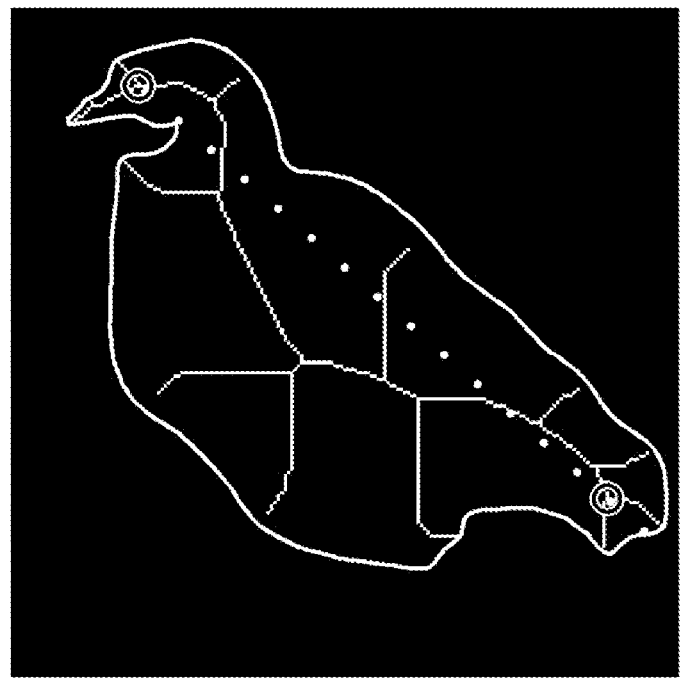
FIG. 21A is a segmented image as contour, centroid as white circle and image positions of depth of profile as trajectory passing through the head and tail shown as dotted line or specific points of the shape analysis map.
Figure 21B:
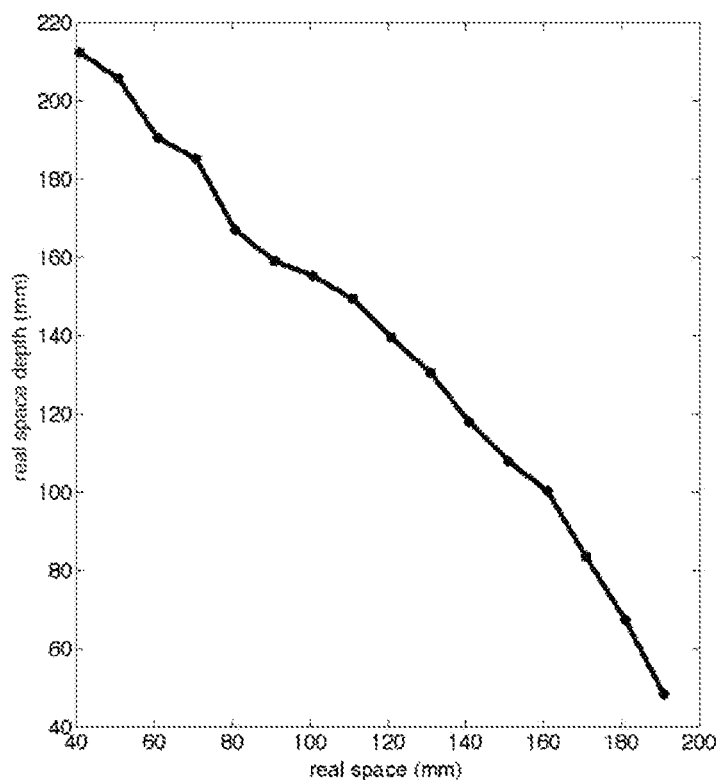
FIG. 21B is the obtained depth profile analysis map in real space.

FIGS. 17-20 show different examples in other livestock, like fighting bull or broiler chicken. In this figures a similar approach to build a body map or a part of a body map is shown. For example, FIG. 17A shows how anatomical reference points are used to build a reference map of the head of a fighting bull to measure distance of the horns, an important feature to establish the value of a fighting bull. Depth profile analysis map can be also used to calculate head orientation and calculate accurately such distance, or even length of the horns as shown in FIG. 17B. Application of the same procedure of skeletonization is shown in FIG. 19 for a broiler chicken. In some cases, it might be important to accurately measure the width of the broiler as shown in FIG. 20. Other endeavors might require accurate measurement in other axis as shown in FIG. 21, or even combination of the information of both axis or of a 2D surface.

Regarding FIGS. 17A-17D tip of the horn of a bull can be detected as the top left and top right positions within the head or above the mouth. Mouth centroid can be detected by color analysis or thermal analysis of the acquired image, as mouth has a well-defined different in color appearance or temperature. Legs can be also measured (see FIG. 17B) and detected by shape analysis similar to pigs by referencing, according to an embodiment, branchpoints and endpoints in the shape analysis map. Tail can be also detected in a same manner as described above with pigs by fitting circular Hough transform or a quadratic function.

Head orientation can be estimated by depth profile analysis in a similar manner to pigs as described above.

Measurement of distance between tips of the horns can be successfully calculated by taking into account head orientation and correcting image distortion introduced not only by (x,y) distance but also depth. Additional information of the total length of the horns can be calculated as shown in FIG. 18. Symmetric properties of the head can be used to locate specific reference points or axis.

Broiler or chicken can be also adapted to the proposed method. For example, FIG. 19 shows a broiler (19A), its segmented image and contours (19B) and the skeletonization with detection of branchpoints and endpoints to build a shape analysis map (19C).

Centroid and axis perpendicular to orientation can be used as a reference to obtain a depth profile in the short axis. Similarly, head and tail obtained from branchpoints can be used to identify long axis and obtain depth profile information in the other direction. Images from top or use of TOF camera allows for calculation of both depths profiles from the same acquisition. Furthermore, points outside the segmented image can be used to calculate the height of the broiler.

Examples of depth profile analysis map are presented as linear measurements, but TOF cameras capturing a 2D image or accumulation of several scanning lines of rotated Lidar that are anatomically mapped to the body map enable to perform other calculations like fitting an ellipsoid. Linear measurements are the more similar measurements when comparing this approach to actually taking a tape measure and measure the length of an animal. However, this method is not restricted to linear measurements and TOF information can be used to fit surfaces.

Also, anatomical points can be further assisted by image information. For example, head of the broilers are warmer than the body and this feature can be used to directly locate the head. In a similar manner, head is normally in the higher that other body parts and this can be exploited by telemetry or image position.

Following, different examples of the proposed method are detailed:

Example 1: Centroid as Shape Analysis Map from Side or Oblique View

Figure 22:
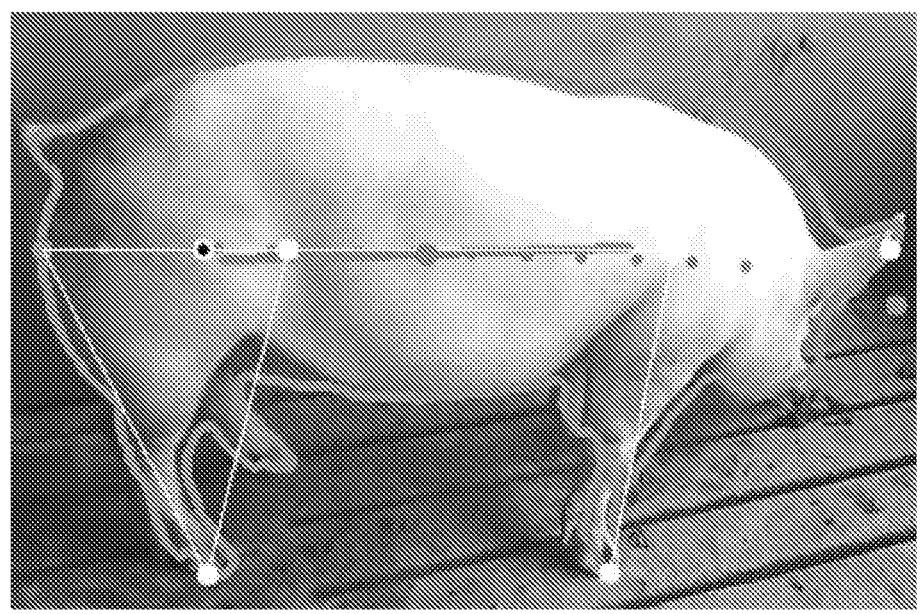
FIG. 22 is a video image, with overlapped segmented area from thermal image and small dots showing Lidar measurements.

Thermal camera, video camera and Lidar have been calibrated. Thus the method comprises step a) acquiring an image with the thermal camera and segmenting by temperature threshold one pig. Then, step b), the method comprises measuring with a rotating Lidar the distance to several points in polar coordinates (rho, phi) and relating Lidar measurements in polar coordinates to specific pixel positions (x,y) within the image. At step c1), the centroid of the pig is computed as the center of mass of the segmented image (x0,y0) as shown in FIG. 22A as the central dot. At step c2) the method finds local minima, maxima and inflexion points as shown in FIGS. 7,8,9 and 10A and computes a depth analysis map of tail, hip max (distance local minima), ham end (inflection point) and cross(distance local minima). Finally, at step c3) the method checks whether any depth point passes near the centroid or whether depth points contained within the segmented image are at a distance of y0, for example, |y−y0|<30. If this is true anatomical points detected by depth analysis map can be accepted as correct.

Example 2: Multiple Anatomical Points Detected by Shape Analysis Map from Side or Oblique View Thermal camera, video camera and Lidar have been calibrated. The method comprises, step a), acquiring an image with thermal camera and segmenting by temperature threshold one pig. Then, at step b), the method comprises measuring with a rotating Lidar the distance to several points in polar coordinates (rho, phi) and relating Lidar measurements in polar coordinates to specific pixel positions (x,y) within the image. At step c1) the method computes a centroid of the segmented image by computing Hough transform to locate tail. If center of detected circle is within a range of distances with centroid further computing skeleton of segmented image as shown in FIG. 6, detecting branch points and end points. Branch point near tail is an approximation for hip max anatomical point. Branch point at the other side at similar height of centroid or hip max is shoulder point below centroid and near tail the lowest end point is back leg feet below centroid and opposite to tail is front leg feet (also nearest to shoulder position to differentiate from head when pig is sniffing the ground). This makes a simple map as shown in FIG. 6C. More complex maps can be computed as also shown in FIGS. 11, 12, 13 and 14. At step c2), the method finds local minima, maxima and inflexion points as shown in FIGS. 7, 8, 9 and 10A and computes a depth analysis map of tail, hip max (distance local minima), ham end (inflection point) and cross (distance local minima). Finally, at step c3) the method checks whether the Lidar measurements within the segmented image cross nearby shoulder and hip max from shape analysis, and also checks whether all anatomical points common in both maps are nearby or shifted at expected positions. If these conditions are true anatomical points detected by depth analysis map can be accepted as correct.

Example 3: Thermal and TOF Cameras from Oblique View

Thermal and TOF camera have been calibrated. The method comprises, step a), acquiring an image with thermal camera and segmenting by temperature threshold one pig. Then, at step b), the method comprises measuring with a TOF camera the distance to several points, computing (rx,ry,rz) positions in real space and relating TOF measurements to specific pixel positions (x,y) within the image. At step c1) then the method computes centroid and orientation of the segmented image via the Hough transform to locate tail. If the center of the detected circle is within a range of distances with centroid the method further computes the skeleton of the segmented image as shown in FIG. 6, detecting branch points and end points. Branch point near tail is an approximation for hip max anatomical point. Branch point at the other side at similar height of centroid or hip max is shoulder point below centroid and near tail the lowest end point is back leg feet below centroid and opposite to tail is front leg feet (also nearest to shoulder position to differentiate from head when pig is sniffing the ground). This makes a simple map as shown in FIG. 6C. More complex maps can be computed as also shown in FIGS. 11, 12, 13 and 14. At step c2, the method then extracts a depth profile by picking a line of TOF image nearby the centroid and with orientation similar to shape analysis or performs a 2D analysis of depth profile within the surface of the segmented image, in other words analyses (rx,ry,rz) points contained within the segmented image. Following, the method finds local minima, maxima and inflexion points as shown in FIGS. 7, 8, 9 and 10A and computes a depth analysis map of tail, hip max (distance local minima), ham end inflection point) and cross (distance local minima). It is also possible to fit the animal into a surface template and locate different anatomical points. Finally, at step c3) the method checks whether all anatomical points common in both maps are nearby or shifted at expected positions. If these conditions are true anatomical points detected by depth analysis map can be accepted as correct.

Example 4: Thermal and TOF Camera from Aerial and Oblique View

Figure 23:
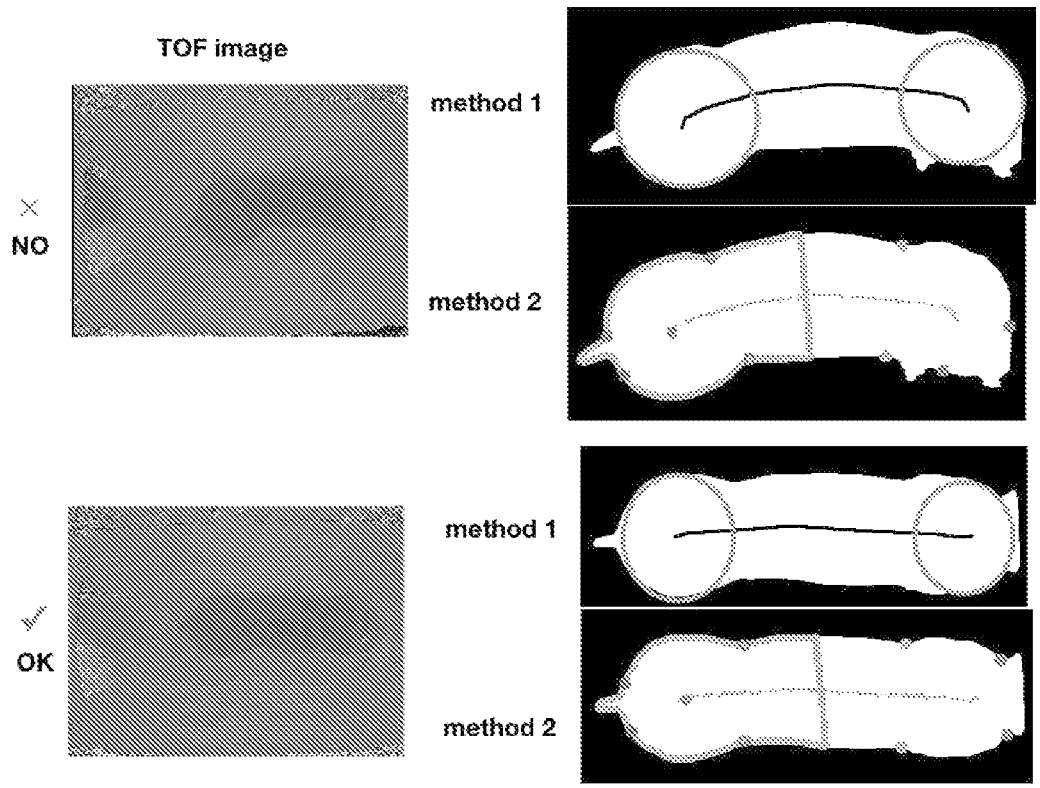
FIG. 23 illustrates distance of TOF images (left) and computation of Hough transform (right) for tail and shoulder detection, spine tracing as medial point by scanning body and computation of additional anatomical points in method 2.

Thermal and TOF camera are calibrated. The method comprises, step a), acquiring an image with thermal camera and segmenting by temperature threshold one pig. Then, at step b), the method comprises measuring with a TOF camera the distance to several points, computing (rx,ry,rz) positions in real space and relating TOF measurements to specific pixel positions (x,y) within the image. At step c1) the method performs the shape analysis using the Hough transform to detect shoulders and tail. Tail is differentiated from shoulder in many forms, for example, area beyond shoulders (head) is much larger compared to tail (only the tail). Alternatively, contour analysis enables direct detection of tail as gradient of tail is much higher compared to head, as shown in FIG. 23 in method 2. Scanning the image from center of shoulders to center of tail enables to determine the spine. Shape analysis map is composed for example by position of shoulders, head and spine points as shown in FIG. 23 method 1, and can be further extended to method 2 if required with additional anatomical points. At step c2) the method calculates the height of the anatomical points. Finally, at step c3), the method checks whether all anatomical points from shape analysis map are at the right height or above a threshold.

Example 5: TOF Camera from Aerial and Oblique View

TOF camera is calibrated. The method comprises, step a), acquiring an image with TOF camera and segmenting by distance threshold compared to background. Then the method, step b), comprises measuring with a TOF camera the distance to several points, computing (rx,ry,rz) positions in real space and relating TOF measurements to specific pixel positions (x,y) within the image. Step c1 in this case is equivalent to example 4. At step c2) the depth analysis map ensures that all segmented area is above a given height from the floor. Finally, at step c3), if all points of shape analysis are found, this means they are at the right distance as it is a pre-requisite of segmentation (step a). Additionally, it is possible to include other calculations like computing curvature of rx,ry,rz points of the spine and give a certain tolerance to such curvature.

Example 6: Combination of TOF and Thermal Images for Additional Features (for the Body Map)

Figure 24:
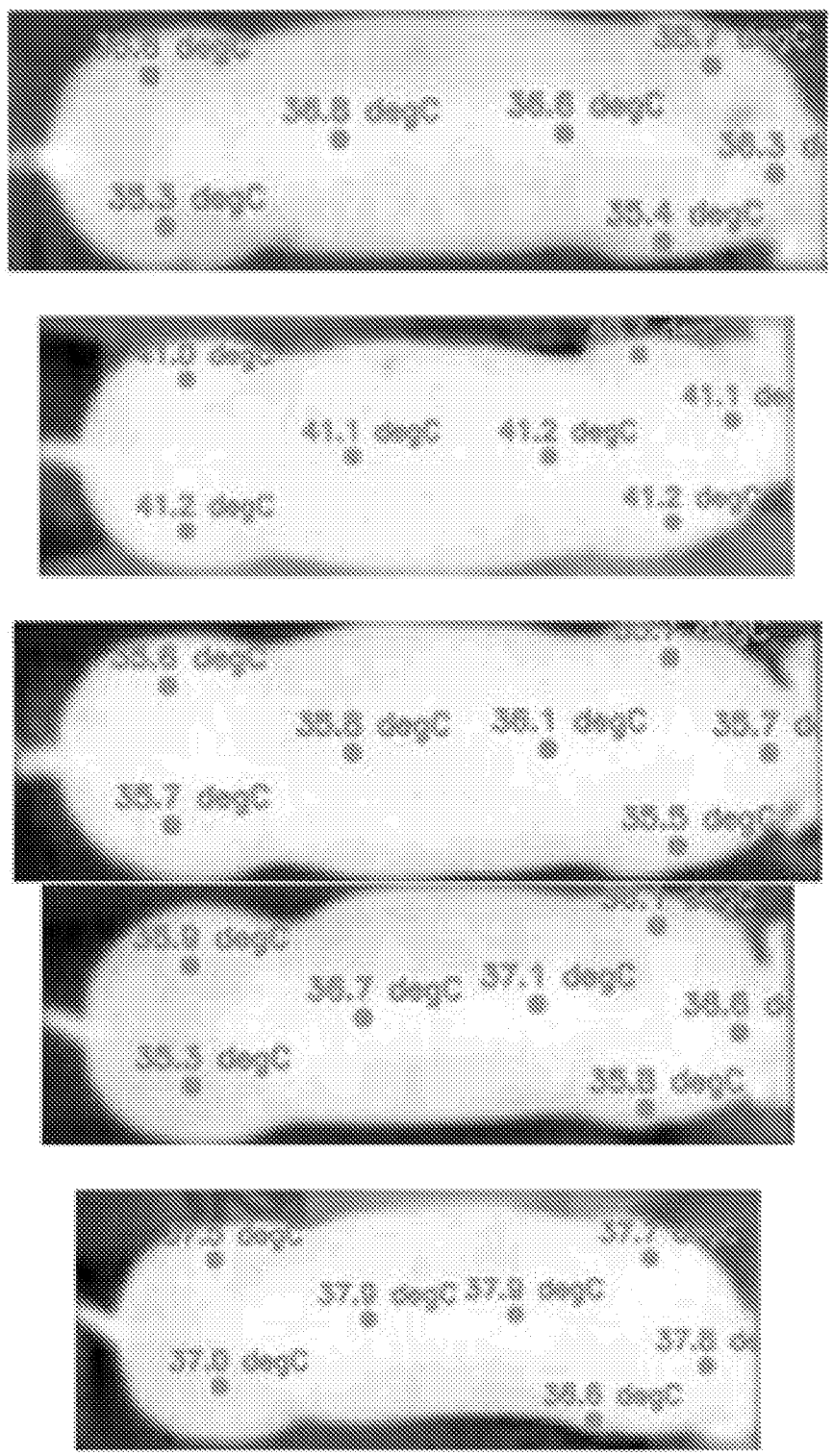
FIG. 24 illustrates an example of the processing of body map which enables extracting additional features from other systems (i.e. thermal cam).

If TOF and Thermal camera are calibrated additional computation of thermal features at different body parts can be computed as shown in FIG. 24.

A device is also provided for the remote characterization of the living specimens. The device mainly comprises the mentioned image acquisition unit, segmentations means, the cited telemetric unit and processing means to process the different described information/data to allow the characterization of the living specimen or complex object. The device can further include a memory to store the different measurements or information processed.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

The invention claimed is:

1. A method for the characterization of living specimens from a distance, the method comprising:
   a) acquiring one image of at least one living specimen via an image acquisition unit and further segmenting the acquired image by a processing unit, providing a segmented image;
   b) measuring, by a telemetric unit, a distance to several parts of said acquired image, providing several distance measurements, and selecting a subset of those distance measurements contained in the segmented image of the living specimen, said image acquisition unit and said telemetric unit being calibrated;
   c) processing, by a processing unit, the segmented image and said several distance measurements referred to different positions contained within the segmented image by:
   c1) characterizing a shape of the living specimen by implementing an algorithm at least computing within the segmented image one or more of the following:
      a centroid of the living specimen,
      an orientation of the living specimen within the segmented image with regard to a reference point, or
      a specific body part of the living specimen by locating anatomical reference points of the living specimen within the segmented image,
   a result of said shape characterization providing a shape analysis map; and
   c2) characterizing a depth of the living specimen by implementing an algorithm at least computing within the distance measurements contained in the segmented image a specific body part of the living specimen by locating anatomical reference points of the living specimen within the distance measurements, a result of the depth characterization providing at least one depth profile analysis map; and c3) comparing the shape analysis map and the depth profile analysis map, wherein:
if a result of said comparison is comprised inside a given range the method further comprises determining parameters of the living specimen including posture parameters, location or correction of said anatomical reference points, and/or body size parameters and/or representing a body map of the living specimen;
if the result of said comparison is comprised outside said given range, the method further comprises repeating steps a) to c) obtaining a new depth profile analysis map and a new shape analysis map; and
wherein steps a) and b) are performed at any time.

2. The method according to claim 1, wherein step a) comprises acquiring several images of said living specimen at different periods of time, capturing different postures of the living specimen, and for each acquired image obtaining a sequence of distance measurements.

3. The method according to claim 1, further comprising estimating part of a three dimensional information of the relative position of the image acquisition unit and the living specimen to obtain at least two of the following parameters: an average of at least one angle between the image acquisition unit and the living specimen, a degree of bending or flatness of the shape of the living specimen, a height of the image acquisition unit with respect to a floor or a height of the image acquisition unit with respect to a height of the living specimen and/or an angle of an optical axis of the image acquisition unit with respect to the floor.

4. The method according to claim 1, wherein the orientation of the living specimen is calculated by fitting the segmented image into an ellipse via a square fitting function, a Gaussian model, principal component analysis, a minimal area rectangle or a Hough transform.

5. The method according to claim 1, wherein the body part of the shape analysis map is computed by:
a circular Hough transform that computes the radius of a ham or of a thigh within the segmented image; or
a second order polynomial function that detects a tail of the living specimen within the segmented image by fitting a parabola around the centroid and an orientation axis.

6. The method according to claim 1, wherein the body part of the shape analysis map is further computed by at least one of:
computing a contour of the living specimen within the segmented image, coding the computed contour in polar coordinates and further applying a Fourier Transform function to said polar coordinates, providing several Fourier coefficients, a modulus of which are rotational invariant and an argument of which contains rotational information;
computing a contour of the living specimen and further calculating distance metrics within said computed contour based on a distance metric including Euclidean, geodesic, or city block;
computing a distance transform of the segmented image;
computing a contour of the living specimen by calculating a skeletonization function from the segmented image, providing an image of the skeleton of the living specimen, and optionally further computing branch points and endpoints within said skeleton to estimate anatomical positions of different body parts;
computing image moments of the segmented image.

7. The method of claim 2, further comprising:
obtaining a sequence of paired depth profile analysis map and shape analysis map by combining the information obtained for each acquisition;
assigning a score to each pair of maps; and
selecting the pair of maps having a highest score.

8. The method according to claim 2, further comprising:
obtaining a sequence of paired depth profile analysis map and shape analysis map by combining the information obtained for each acquisition;
assigning a score to each pair of maps; and
matching anatomical reference points within all acquisitions and accumulating different pieces of the depth profiles analysis maps and anatomical reference points to compute a three dimensional reconstruction of the living specimen, or
computing a body map for each acquisition and accumulating all information of each body map, and scoring into an extended body map.

9. The method according to claim 1, wherein a body map of the living specimen is represented, the body map being further used to calculate characteristics of the body map based on features of the image acquisition unit including color and/or temperature and/or to calculate additional characteristics measured by an additional device, previously calibrated.

10. The method according to claim 1, wherein the acquired image in step a) includes two or more living specimens, and the method comprising computing and comparing the shape analysis map and the depth profile analysis map of each of the two or more living specimens included in the image, so evaluating the two or more living specimens in the same acquisition.

11. The method according to claim 1, wherein the body map is a 3D representation of the living specimen.

12. The method according to claim 1, wherein the living specimen is a livestock animal including a pig, a bull, a cow, a sheep, a broiler, a duck, or a chicken.

13. A device for the characterization of living specimens from a distance, comprising:
an image acquisition unit configured to acquire at least one image of at least one living specimen;
a first processing unit configured to segment the acquired image, providing a segmented image;
a telemetric unit configured to measure a distance to several parts of said acquired image, providing several distance measurements, and to measure a subset of those distance measurements contained in the segmented image of the living specimen, said image acquisition unit and said telemetric unit being calibrated; and
a second processing unit configured to process the segmented image and said several distance measurements referred to different positions contained within the segmented image by:
characterizing a shape of the living specimen by implementing an algorithm at least computing within the segmented image one or more of the following: a centroid of the living specimen, an orientation of the living specimen within the segmented image with regard to a reference point, or a specific body part of the living specimen by locating anatomical reference points of the living specimen within the segmented image, a result of said shape characterization providing a shape analysis map;
characterizing a depth of the living specimen by implementing an algorithm at least computing within the distance measurements contained in the segmented image a specific body part of the living specimen by locating anatomical reference points of the living specimen within the distance measurements, a result of the depth characterization providing at least one depth profile analysis map; and comparing the shape analysis map and the depth profile analysis map, wherein:

if a result of said comparison is comprised inside a given range the method further comprises determining parameters of the living specimen including posture parameters, and/or location or correction of said anatomical reference points, and/or body size parameters and/or representing a body map of the living specimen;

if the result of said comparison is comprised outside said given range, the method further comprises repeating steps a) to c) obtaining a new depth profile analysis map and a new shape analysis map.

14. The device of claim 13, wherein the image acquisition system comprises at least one of a RGB camera with extended NIR in the red channel or a thermal camera.

15. The device of claim 13, wherein the telemetric unit comprises a rotating Lidar, a scanning Lidar, a plurality of Lidars, a time-of-flight (TOF) sensor, or a TOF camera.

16. The method according to claim 5, wherein the body part of the shape analysis map is further computed by at least one of:

computing a contour of the living specimen within the segmented image, coding the computed contour in polar coordinates and further applying a Fourier Transform function to said polar coordinates, providing several Fourier coefficients, a modulus of which are rotational invariant and an argument of which contains rotational information;

computing a contour of the living specimen and further calculating distance metrics within said computed contour based on a distance metric including Euclidean, geodesic, or city block;

computing a distance transform of the segmented image;

computing a contour of the living specimen by calculating a skeletonization function from the segmented image, providing an image of the skeleton of the living specimen, and optionally further computing branchpoints and endpoints within said skeleton to estimate anatomical positions of different body parts;

computing image moments of the segmented image.

* * * * *